US011060484B2

(12) United States Patent
Silkey et al.

(10) Patent No.: US 11,060,484 B2
(45) Date of Patent: Jul. 13, 2021

(54) NOZZLE WALL FOR AN AIR-BREATHING ENGINE OF A VEHICLE AND METHOD THEREFOR

(71) Applicant: The Boeing Company, Chicago, IL (US)

(72) Inventors: Joseph S. Silkey, Lake St. Louis, MO (US); Timothy H. Franklin, Ballwin, MO (US); Richard S. Dyer, Maryland Heights, MO (US)

(73) Assignee: The Boeing Company, Chicago, IL (US)

( * ) Notice: Subject to any disclaimer, the term of this patent is extended or adjusted under 35 U.S.C. 154(b) by 186 days.

(21) Appl. No.: 16/023,411

(22) Filed: Jun. 29, 2018

(65) Prior Publication Data
US 2020/0003160 A1 Jan. 2, 2020

(51) Int. Cl.
*F02K 9/97* (2006.01)
*B64D 33/02* (2006.01)
*F02C 7/057* (2006.01)
*F02K 7/16* (2006.01)

(52) U.S. Cl.
CPC .............. *F02K 9/972* (2013.01); *B64D 33/02* (2013.01); *F02C 7/057* (2013.01); *B64D 2033/026* (2013.01); *F02K 7/16* (2013.01)

(58) Field of Classification Search
CPC . B64D 33/08; F01D 25/12; F02C 7/12; F02K 9/972; F05D 2240/128
See application file for complete search history.

(56) References Cited

U.S. PATENT DOCUMENTS

| 3,030,769 A | 4/1962 | Badders |
| 3,091,082 A | 5/1963 | Newcomb et al. |
| 4,254,618 A * | 3/1981 | Elovic .................... F02C 7/185 60/226.1 |
| 9,194,294 B2 * | 11/2015 | Suciu ........................ F02C 7/32 |
| 2008/0128547 A1 * | 6/2008 | Pederson ................. F02K 7/14 244/55 |
| 2008/0206042 A1 * | 8/2008 | Lee ......................... F01D 11/24 415/116 |

(Continued)

FOREIGN PATENT DOCUMENTS

| CN | 205955856 | 2/2017 |
| EP | 1527997 | 5/2005 |
| GB | 2461367 | 1/2010 |

OTHER PUBLICATIONS

Pasquale M. Sforza, "Electric Power Generation Onboard Hypersonic Aircraft", AIAA 2009-5119, 45th AIAA/ASME/SAE/ASEE Joing Propulsion Conference & Exhibit, Joint Propulsion Confrences, Aug. 2-5, 2009, Denver, Colorado.

(Continued)

*Primary Examiner* — Scott J Walthour
(74) *Attorney, Agent, or Firm* — Perman & Green LLP

(57) ABSTRACT

A nozzle wall for an air-breathing engine, the nozzle wall including a first wall surface subject to engine exhaust flow, a nozzle cooling system including at least one heat exchange fluid passage disposed adjacent the first wall surface so as to increase a temperature of a cooling fluid flowing from a fluid reservoir to at least a power extraction device, and the cooling fluid is ejected from the nozzle cooling system downstream from the power extraction device.

20 Claims, 13 Drawing Sheets

(56) References Cited

U.S. PATENT DOCUMENTS

2013/0305686 A1* 11/2013 Conrardy .................. F02K 7/16
                                                                  60/226.1
2015/0275769 A1* 10/2015 Foutch ...................... F02C 9/18
                                                                  60/776

OTHER PUBLICATIONS

Marc Bouchez, "Scramjet Thermal Management", RTO-EN-AVT-185-13, North Atlantic Treaty Organization, Science and Technology Organization, Sep. 16, 2010, http://www.sto.nato.int.

L. Piancastelli, S. Cassani, "High Altitude Operations with Piston Engines Power Plant Design Optimization Part V: Nozzle Design and Ramjet General Considerations", ARPN Journal of Engineering and Applied Sciences, vol. 12, No. 7, Apr. 2017.

R. Lance, D. Weary, "Space Shuttle Orbiter Auxiliary Power Unit Development Challenges", N85-16945, National Aeronautics and Space Administration, Jan. 1, 1985, NASA document ID. 19850008636.

R.T. Cook, "Advanced Cooling Techniques for High-Pressure Hydrocarbon-Fueled Engines", NASA-CR-159790, National Aeronautics and Space Administration, Oct. 1979.

"Liquid Rocket Engine Fluid-Cooled Combustion Chambers", National Aeronautics and Space Administration, Apr. 1972, NASA-SP-8087, NASA document ID. 19730022965.

H. E. Louie, "X-15 Research Vehicle Auxiliary Power System", National Aeronautics and Space Engineering and Manufacturing Meeting, Oct. 4-8, 1965, Los Angeles, CA.

Kanda T. et al, "Effect of Film Cooling/Regenerative Cooling and Scramjet Engine Performances", Journal of Propulsion and Power, NTRS-NASA Technical Reports Server, US, vol. 10, No. 5, Sep. 1, 1994, pp. 618-624.

European Search Report dated Nov. 14, 2019; European Application No. 19177526.

* cited by examiner

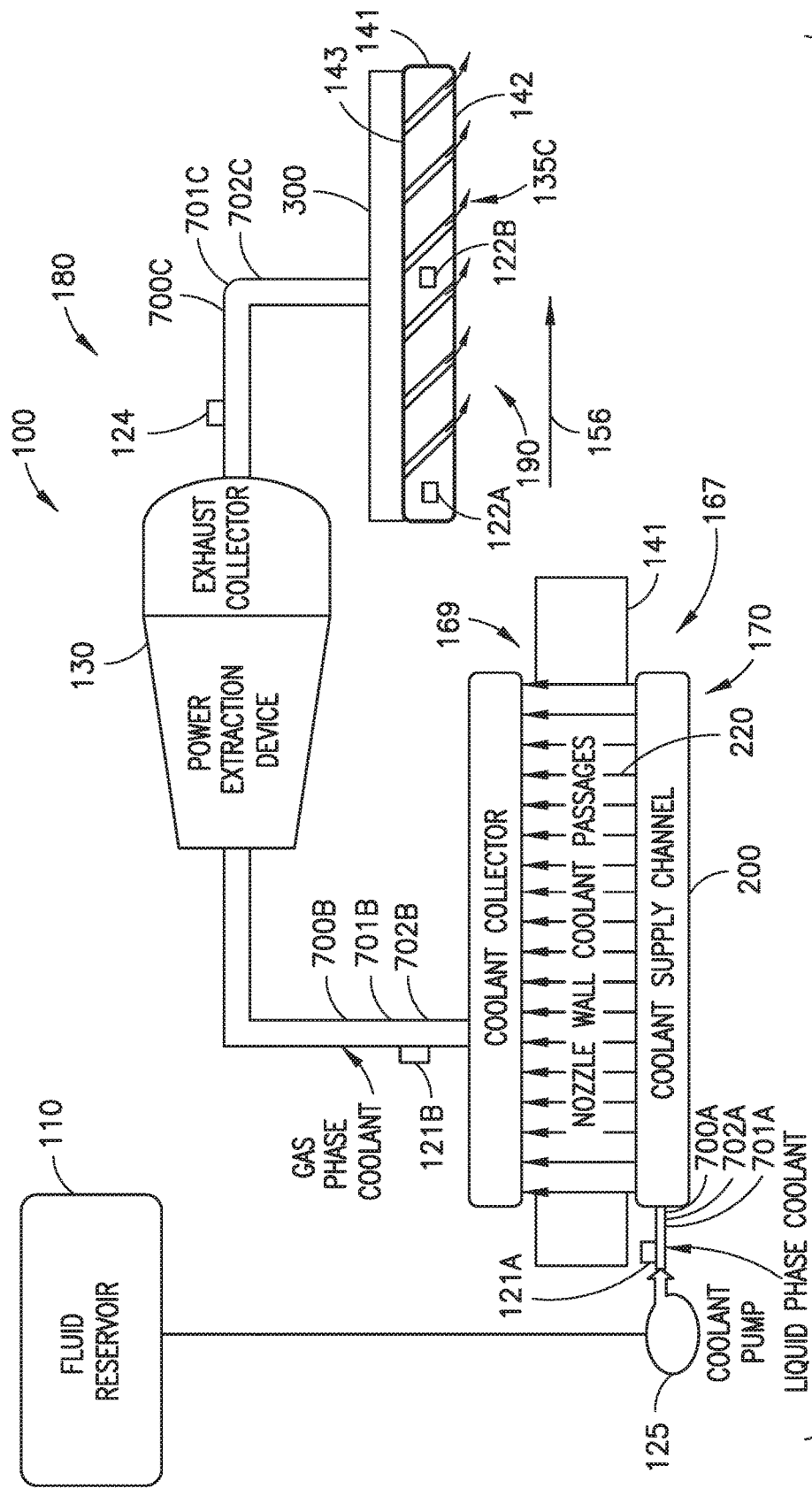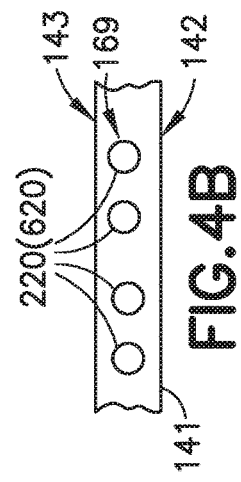

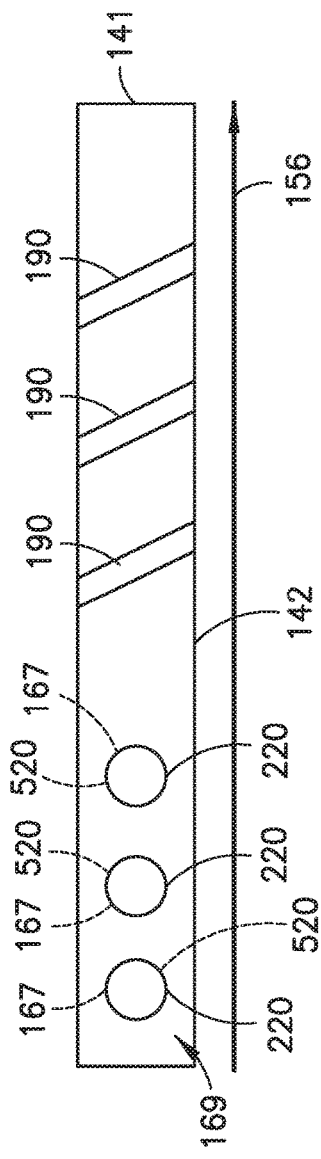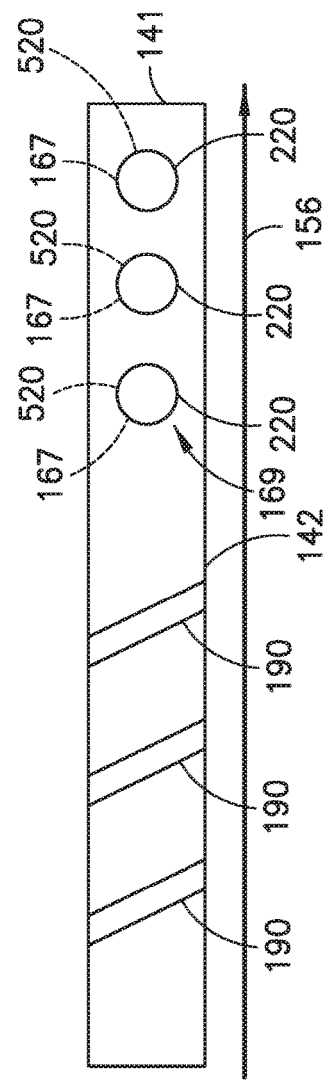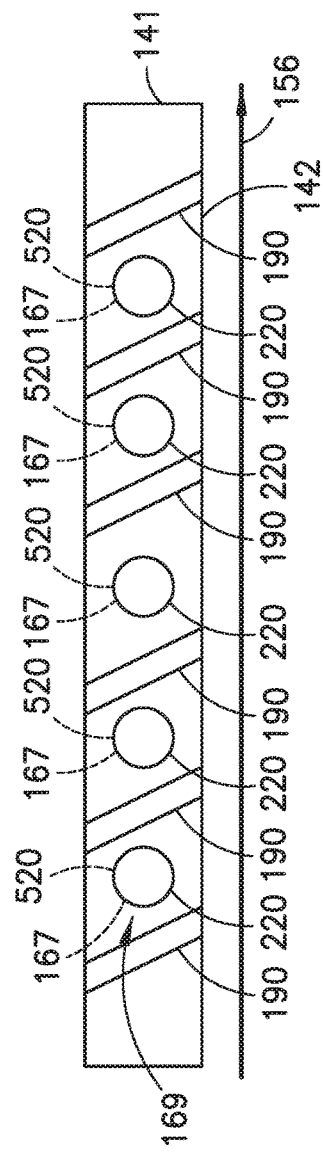

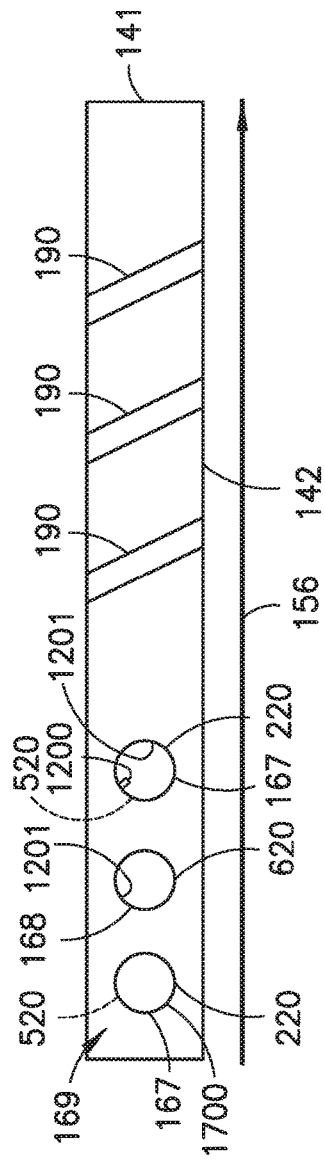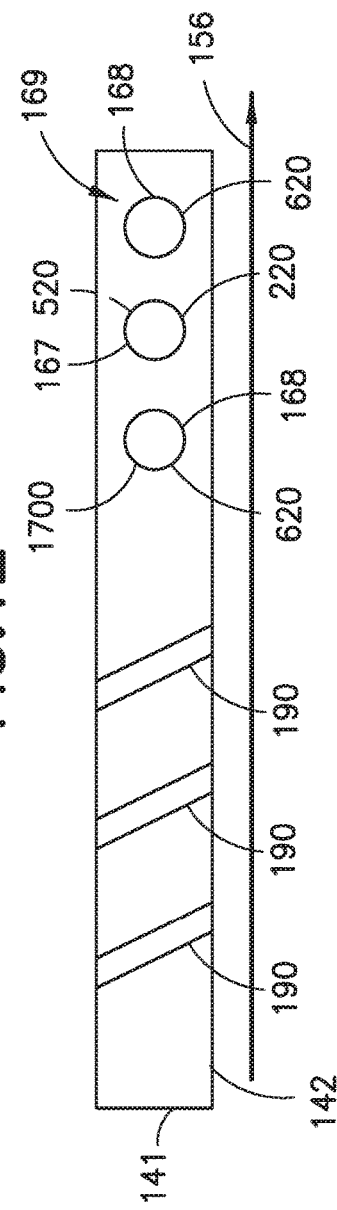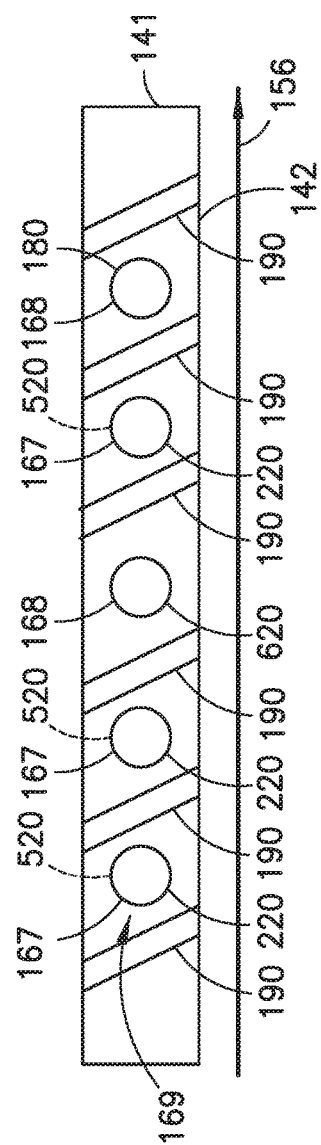

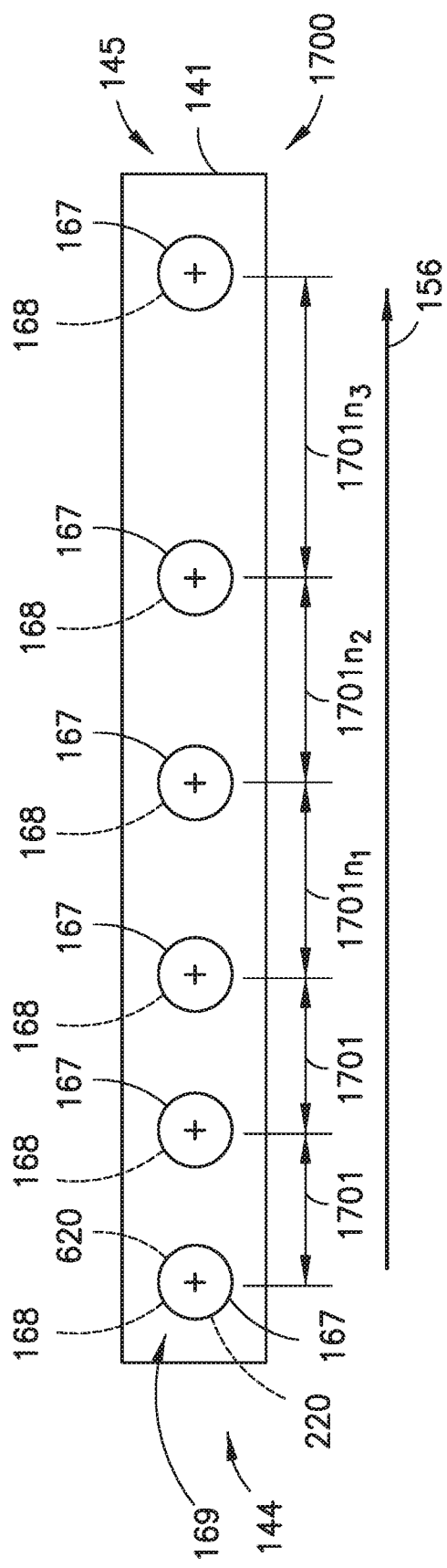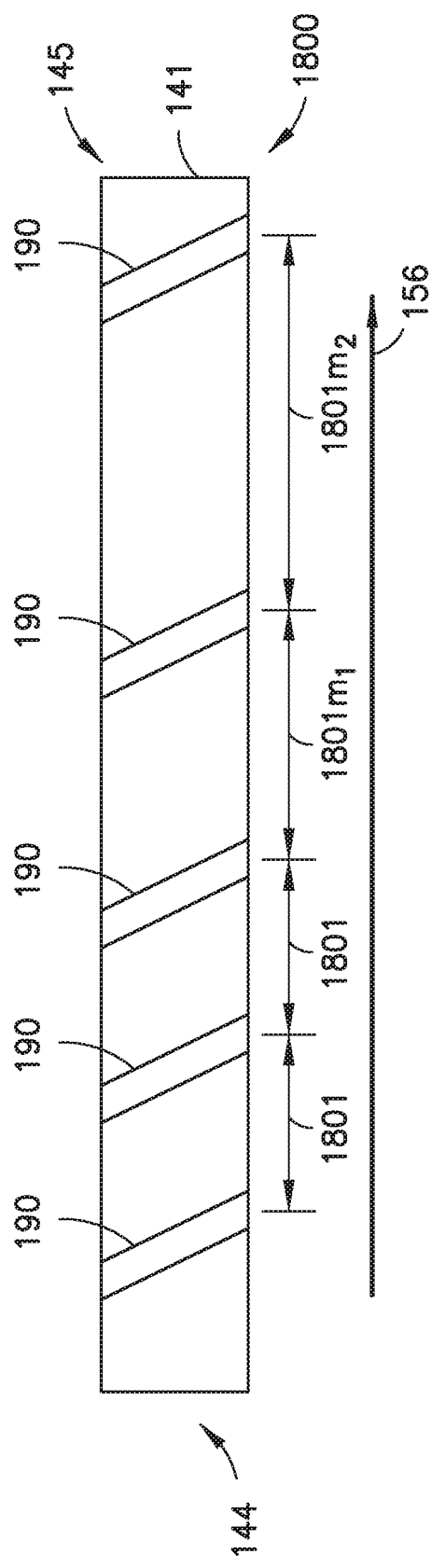

NOZZLE WALL FOR AN AIR-BREATHING ENGINE OF A VEHICLE AND METHOD THEREFOR

BACKGROUND

1. Field

The exemplary embodiments generally relate to nozzle walls, such as for exhaust nozzles of air-breathing engines of a vehicle, and more particularly to nozzle walls including a nozzle cooling system(s).

2. Brief Description of Related Developments

At least some hypersonic vehicles use a ramjet or scramjet engines for propulsion, where combustion gases from the ramjet or scramjet engine provide thrust for the hypersonic vehicle. The combustion gases flowing over walls of a nozzle of the ramjet or scramjet engine can be in excess of about 3,000° F. (or about 1650° C.). As such, cooling solutions for ramjets and scramjets have been proposed that include regenerative film cooling, cooling ducts, film cooling, and/or ablative thermal insulation within the nozzle.

In addition, ramjet and scramjet engines require power to operate their high pressure (e.g., about 1,000 psi or about 6900 kPa) fuel pumps. The ramjet and scramjet engines do not include turbomachinery that can extract and provide mechanical power to the fuel pump or provide power to the vehicle. Generally, hypersonic vehicles utilize batteries or auxiliary power units as a power source and have actively cooled nozzles or utilize ablative material in the nozzle, as noted above. Active cooling can use a heat sink from, for example, the fuel that is typically reserved for cooling the engines or an expendable heat sink that increases the weight of the hypersonic vehicle. Further, ablative materials may not provide for reuse and increase the cost of operating the hypersonic vehicle.

SUMMARY

Accordingly, apparatuses and methods, intended to address or solve at least one or more of the above-identified problems or concerns, would find utility.

The following is a non-exhaustive list of examples, which may or may not be claimed, of the subject matter according to the present disclosure.

One example of the subject matter according to the present disclosure relates to a nozzle wall for an air-breathing engine, the nozzle wall comprising: a first wall surface subject to engine exhaust flow; a nozzle cooling system including at least one heat exchange fluid passage disposed adjacent the first wall surface so as to increase a temperature of a cooling fluid flowing from a fluid reservoir to at least a power extraction device; and wherein the cooling fluid is ejected from the nozzle cooling system downstream from the power extraction device.

Another example of the subject matter according to the present disclosure relates to an air-breathing engine comprising: a nozzle; a nozzle cooling system including a first cooling subsystem coupled to the nozzle so as to transfer heat from the nozzle to a cooling fluid flowing from a fluid reservoir to at least a power extraction device; and wherein the cooling fluid is ejected from the nozzle cooling system downstream from the power extraction device.

Still another example of the subject matter according to the present disclosure relates to a vehicle comprising: an air-breathing engine having a nozzle where engine exhaust flow exits the air-breathing engine through the nozzle; a nozzle cooling system including a first cooling subsystem coupled to the nozzle so as to transfer heat from the nozzle to a cooling fluid flowing from a fluid reservoir to at least a power extraction device; and wherein the cooling fluid is ejected from the nozzle cooling system downstream from the power extraction device.

Yet another example of the subject matter according to the present disclosure relates to a method for operating an air-breathing engine, the method comprising: transferring heat to a cooling fluid from a nozzle of the air-breathing engine using a first cooling subsystem of a nozzle cooling system coupled to the nozzle, where the cooling fluid flows from a fluid reservoir through the first cooling subsystem to at least a power extraction device; and ejecting the cooling fluid from the nozzle cooling system downstream from the power extraction device.

Another example of the subject matter according to the present disclosure relates to a method for operating a vehicle, the method comprising: transferring heat to a cooling fluid from a nozzle of an air-breathing engine of the vehicle using a first cooling subsystem of a nozzle cooling system coupled to the nozzle, where the cooling fluid flows from a fluid reservoir through the first cooling subsystem to at least a power extraction device, and where engine exhaust flow exits the air-breathing engine through the nozzle; and ejecting the cooling fluid from the nozzle cooling system downstream from the power extraction device.

BRIEF DESCRIPTION OF THE DRAWINGS

Figure 1:
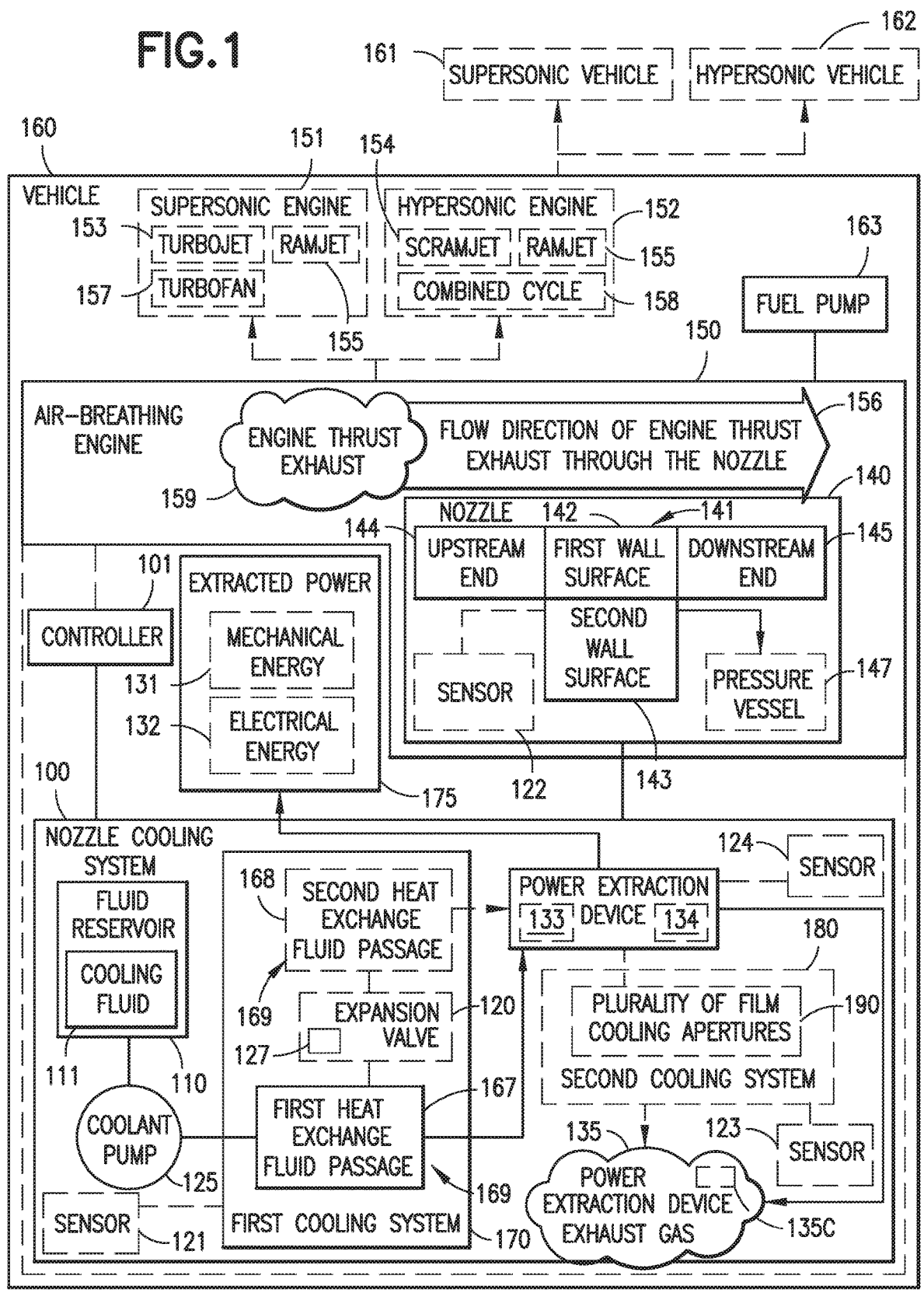
Figure 2:
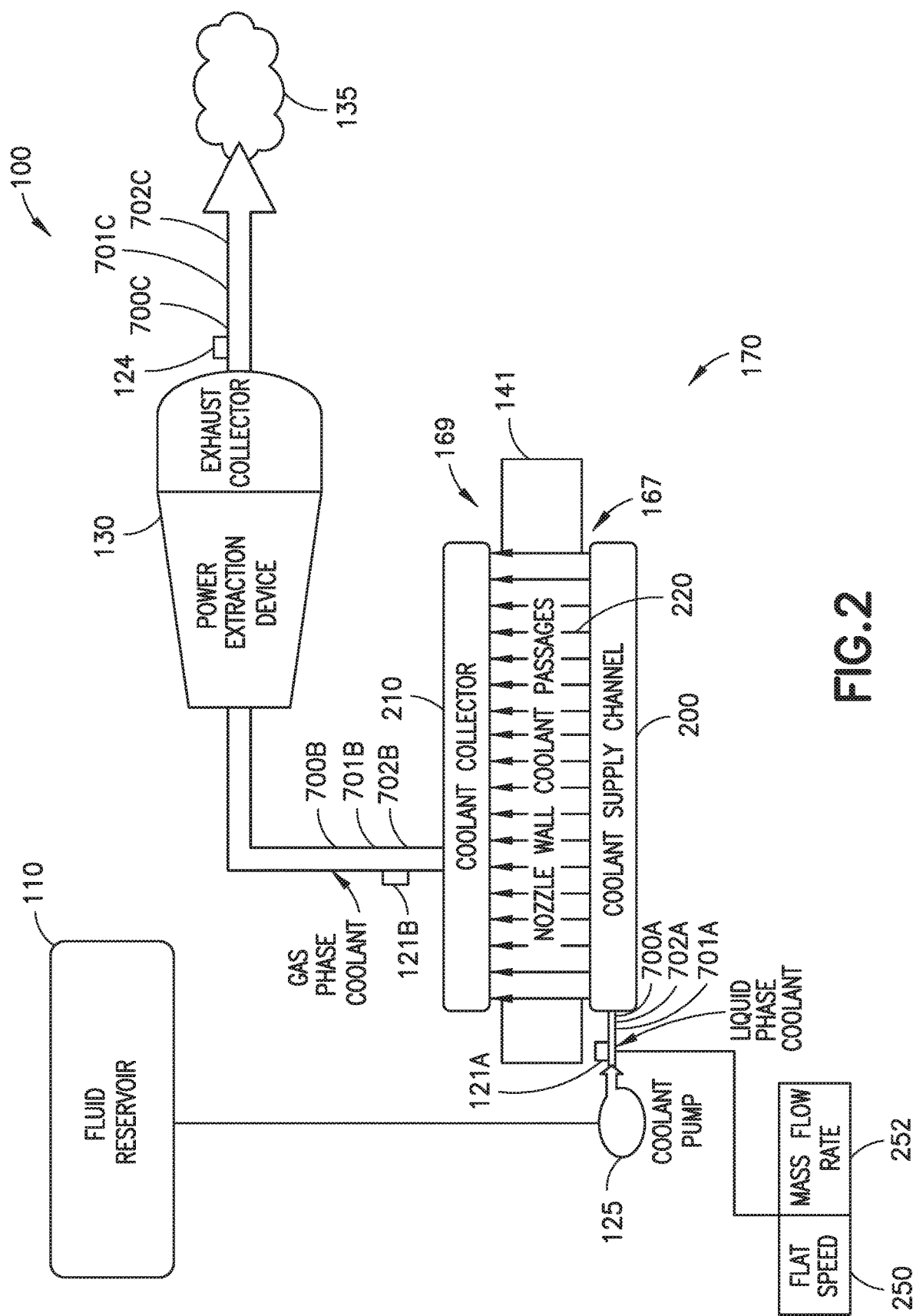
Figure 5:
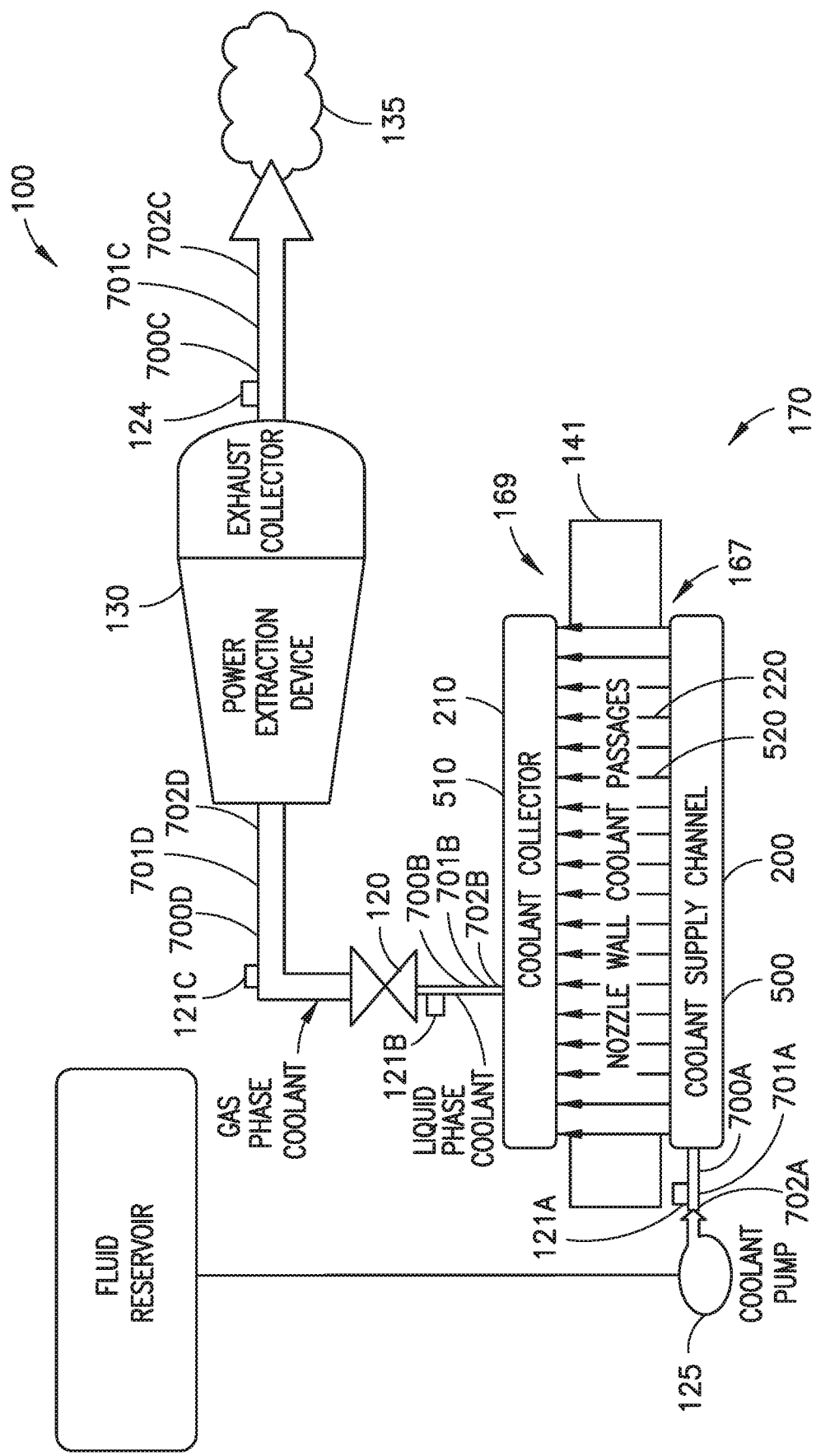
Figure 6:
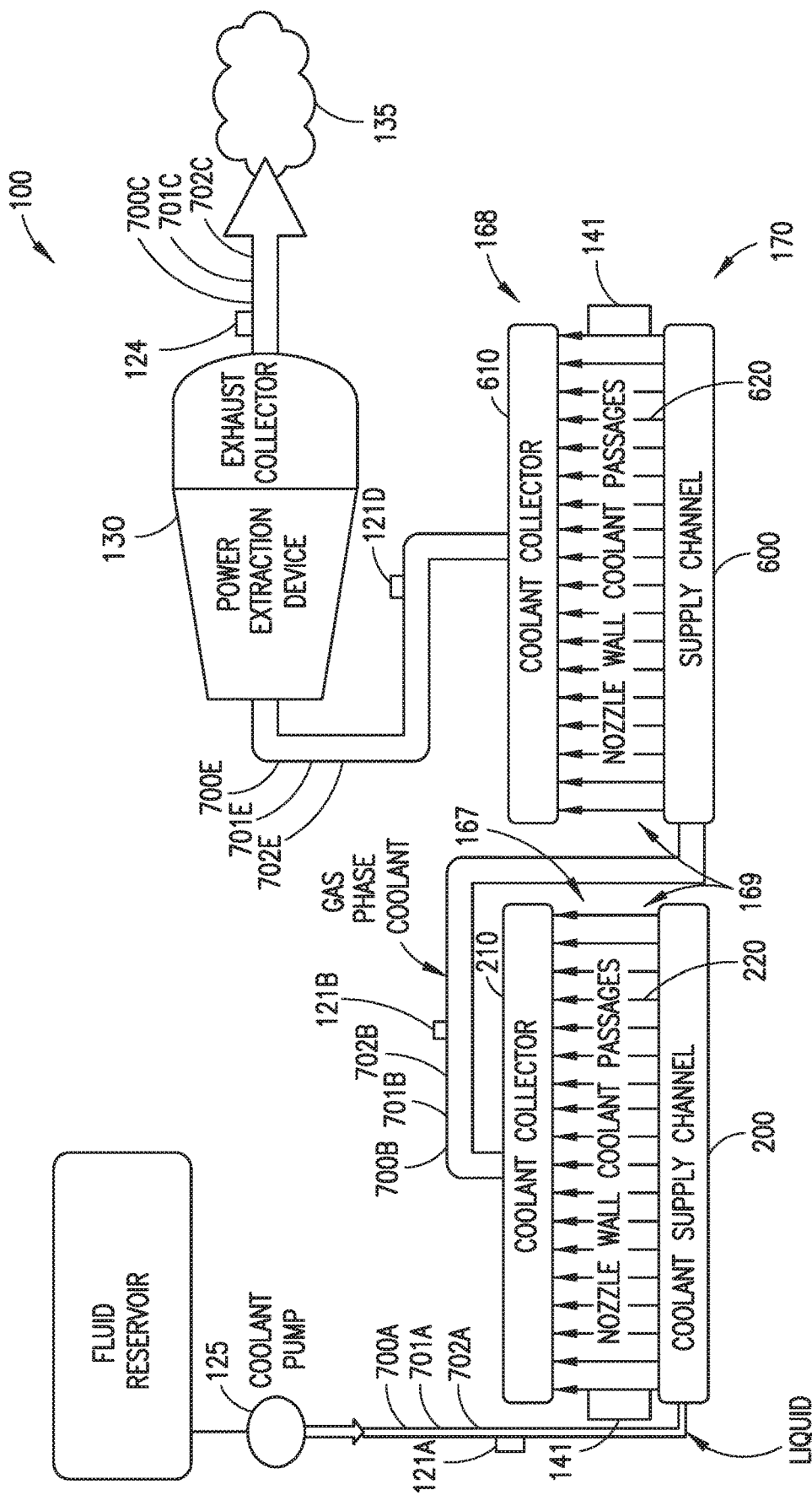
Figure 7:
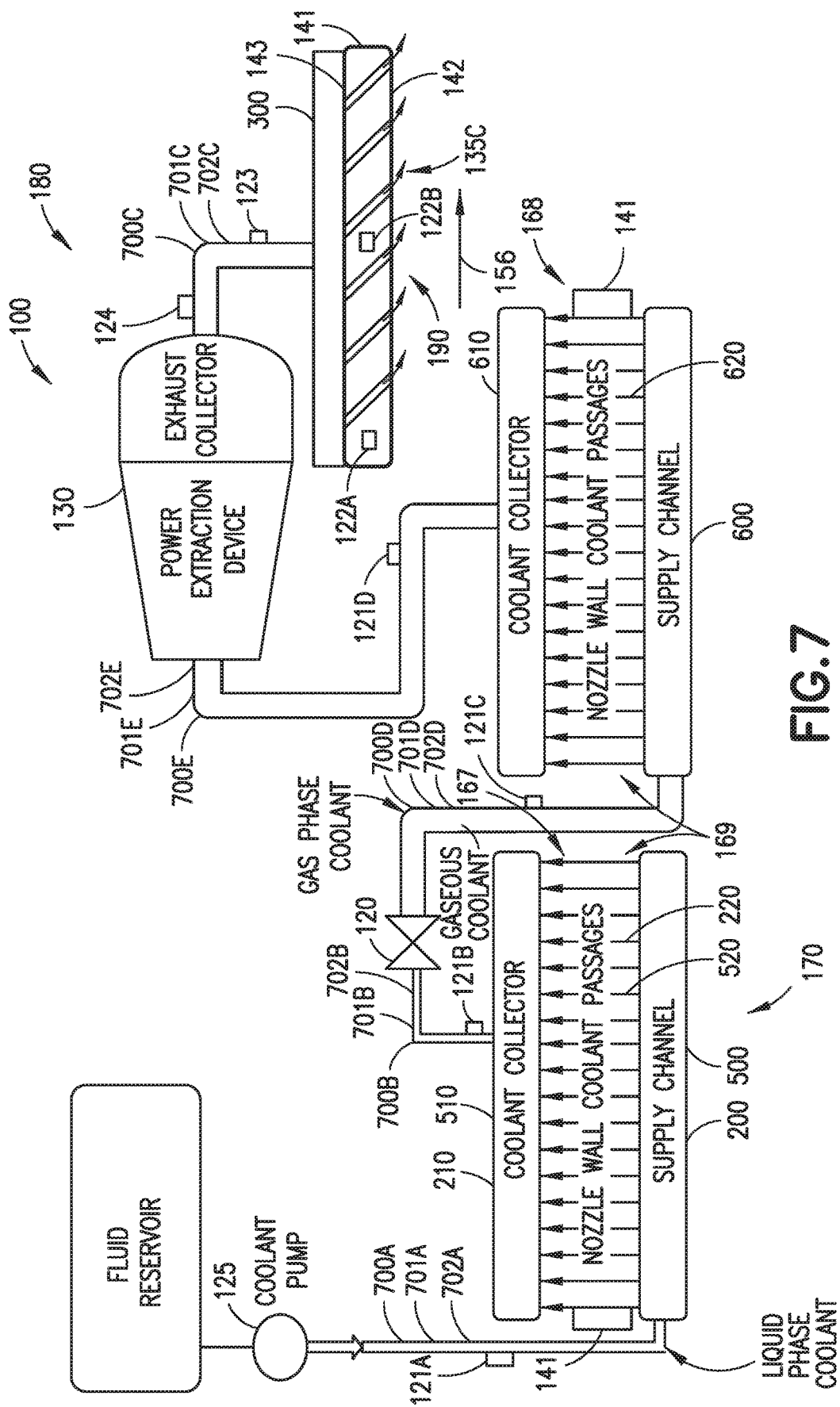
Figure 11:
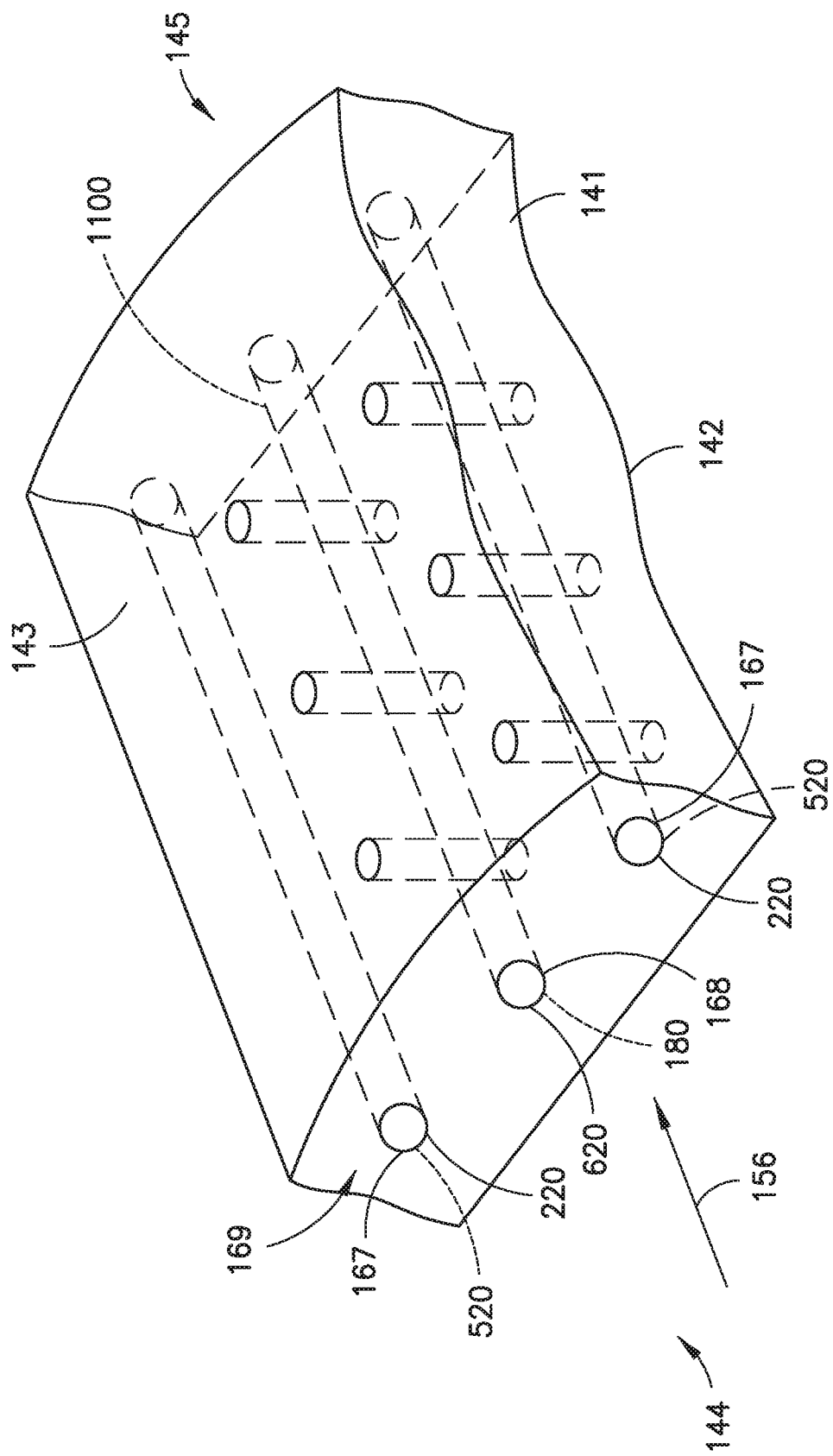
Figure 15:
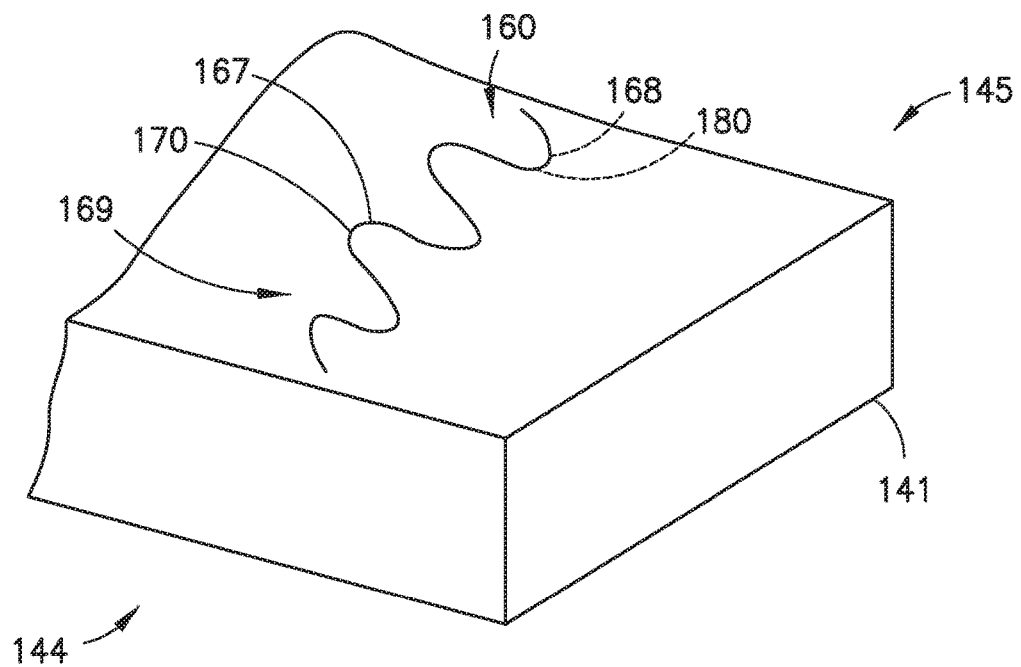
Figure 16:
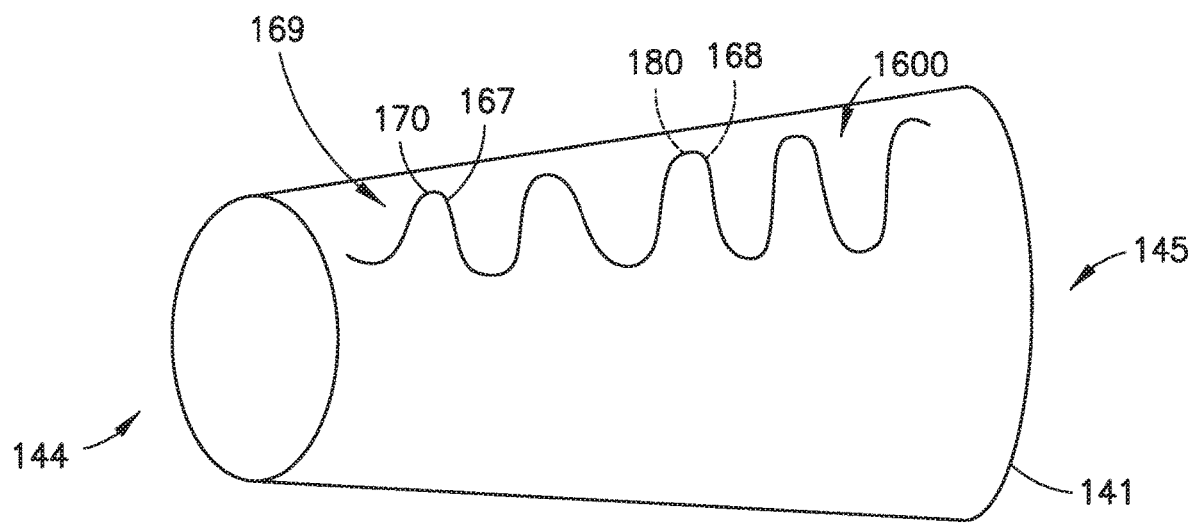
Figure 19:
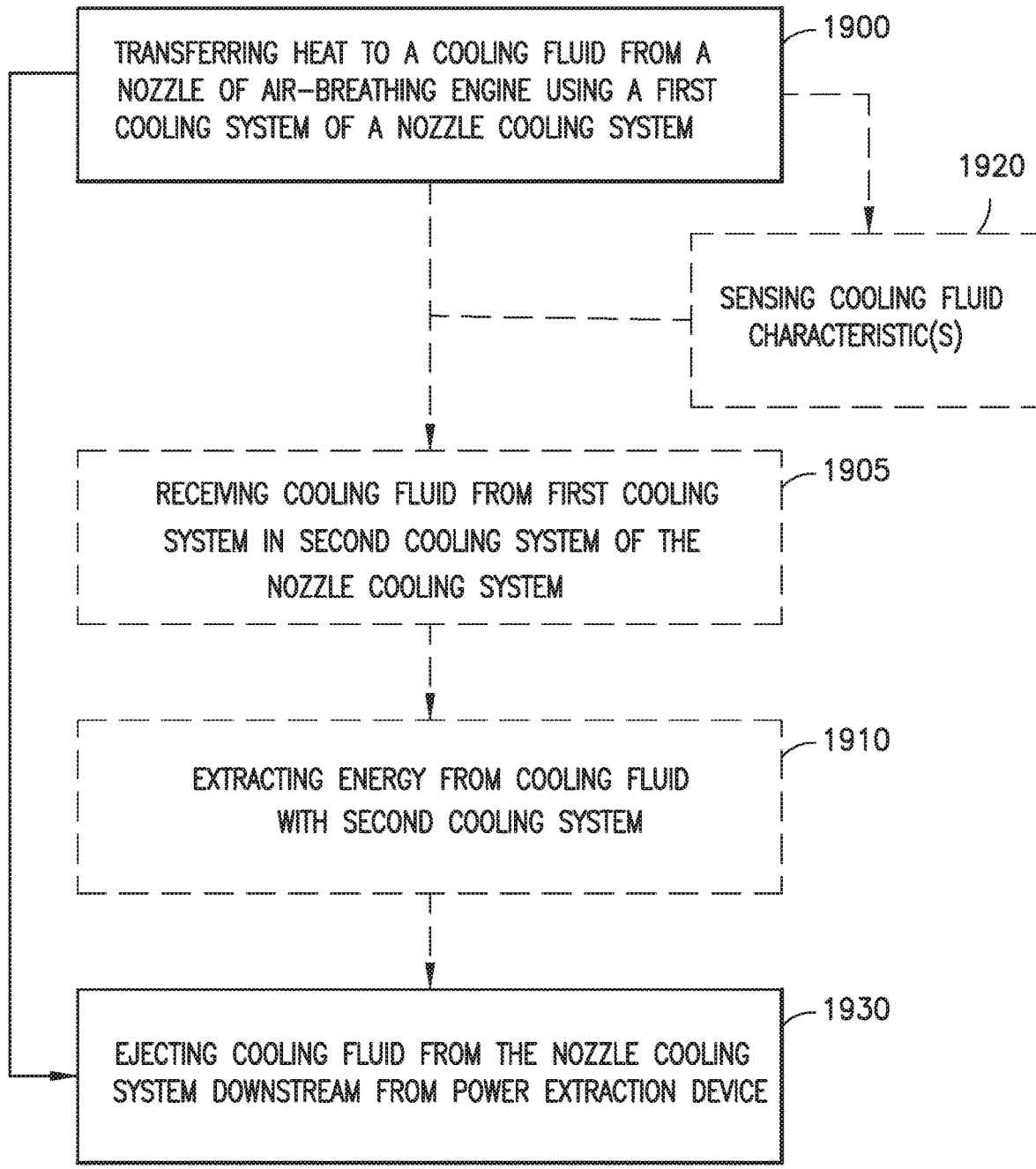
Figure 20:
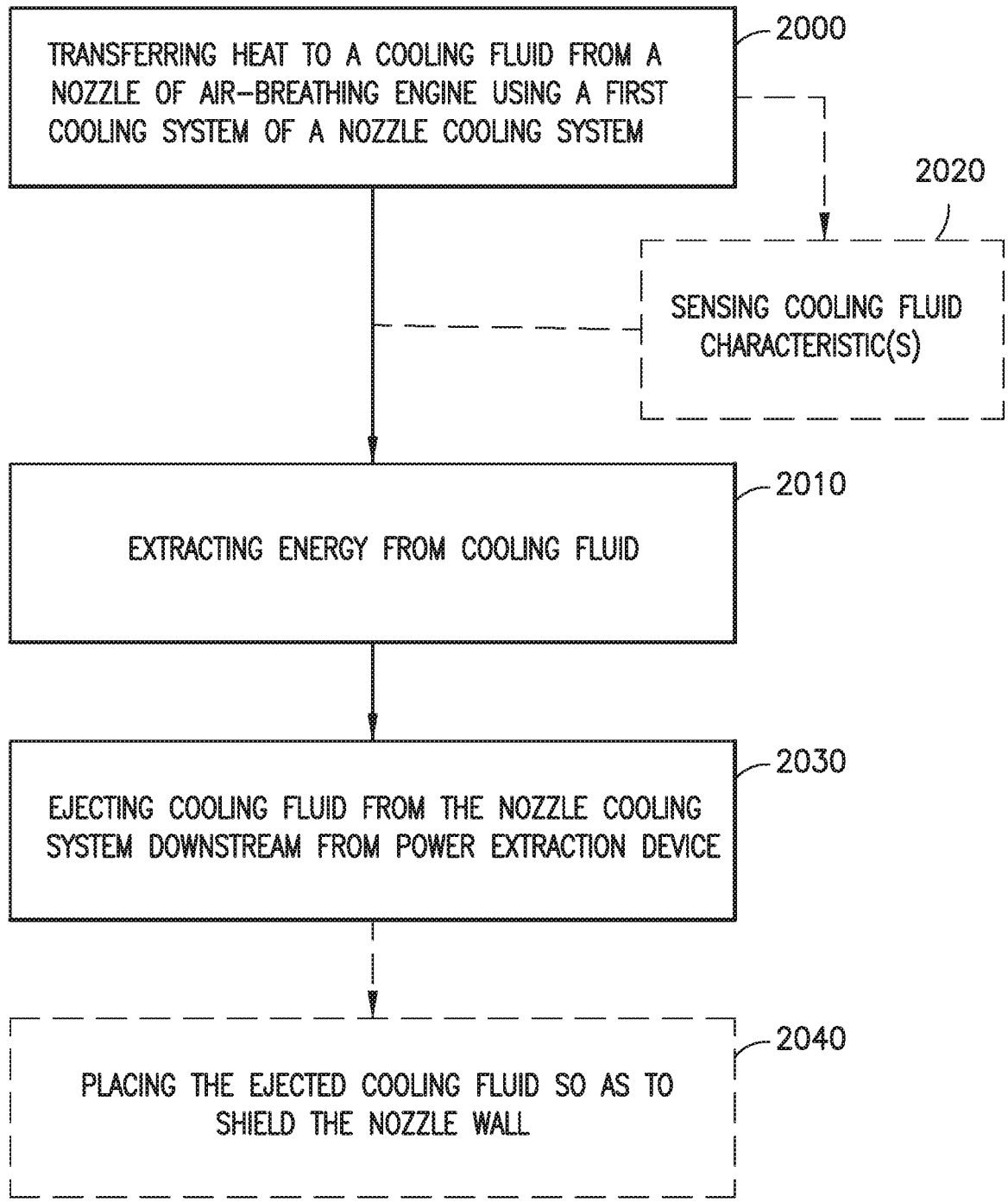

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic block diagram of a vehicle incorporating a nozzle and nozzle cooling system in accordance with aspects of the disclosed embodiment;

FIG. 2 is a schematic block diagram of the nozzle cooling system of FIG. 1 in accordance with aspects of the disclosed embodiment;

FIG. 3 is a schematic block diagram of the nozzle cooling system of FIG. 2 including additional cooling features in accordance with aspects of the disclosed embodiment;

FIG. 4A is a side cross-sectional illustration of a portion of the nozzle cooling system of FIG. 1 in accordance with aspects of the disclosed embodiment;

FIG. 4B is a side cross-sectional illustration of a portion of the nozzle cooling system of FIG. 1 in accordance with aspects of the disclosed embodiment;

FIG. 5 is a schematic block diagram of the nozzle cooling system of FIG. 2 including additional cooling features in accordance with aspects of the disclosed embodiment;

FIG. 6 is a schematic block diagram of the nozzle cooling system of FIG. 2 including additional cooling features in accordance with aspects of the disclosed embodiment;

FIG. 7 is a schematic block diagram of the nozzle cooling system of FIG. 2 including additional cooling features in accordance with aspects of the disclosed embodiment;

FIG. 8 is a schematic cross-sectional illustration of a portion of the nozzle of FIG. 1 incorporating features of the nozzle cooling system of FIG. 1 in accordance with aspects of the disclosed embodiment;

FIG. 9 is a schematic cross-sectional illustration of a portion of the nozzle of FIG. 1 incorporating features of the nozzle cooling system of FIG. 1 in accordance with aspects of the disclosed embodiment;

FIG. 10 is a schematic cross-sectional illustration of a portion of the nozzle of FIG. 1 incorporating features of the nozzle cooling system of FIG. 1 in accordance with aspects of the disclosed embodiment;

FIG. 11 is a schematic perspective sectional illustration of a portion of the nozzle of FIG. 1 incorporating features of the nozzle cooling system of FIG. 1 in accordance with aspects of the disclosed embodiment;

FIG. 12 is a schematic cross-sectional illustration of a portion of the nozzle of FIG. 1 incorporating features of the nozzle cooling system of FIG. 1 in accordance with aspects of the disclosed embodiment;

FIG. 13 is a schematic cross-sectional illustration of a portion of the nozzle of FIG. 1 incorporating features of the nozzle cooling system of FIG. 1 in accordance with aspects of the disclosed embodiment;

FIG. 14 is a schematic cross-sectional illustration of a portion of the nozzle of FIG. 1 incorporating features of the nozzle cooling system of FIG. 1 in accordance with aspects of the disclosed embodiment;

FIG. 15 is a schematic perspective illustration of a portion of the nozzle of FIG. 1 incorporating features of the nozzle cooling system of FIG. 1 in accordance with aspects of the disclosed embodiment;

FIG. 16 is a schematic perspective illustration of a portion of the nozzle of FIG. 1 incorporating features of the nozzle cooling system of FIG. 1 in accordance with aspects of the disclosed embodiment;

FIG. 17 is a schematic cross-sectional illustration of a portion of the nozzle of FIG. 1 incorporating features of the nozzle cooling system of FIG. 1 in accordance with aspects of the disclosed embodiment;

FIG. 18 is a schematic cross-sectional illustration of a portion of the nozzle of FIG. 1 incorporating features of the nozzle cooling system of FIG. 1 in accordance with aspects of the disclosed embodiment;

FIG. 19 is a flow diagram of an exemplary method of operating an air-breathing engine including the nozzle and nozzle cooling system of FIG. 1 in accordance with aspects of the disclosed embodiment; and FIG. 20 is a flow diagram of an exemplary method of operating a vehicle including the nozzle and nozzle cooling system of FIG. 1 in accordance with aspects of the disclosed embodiment.

DETAILED DESCRIPTION

Referring to FIG. 1, the aspects of the disclosed embodiment provide for a nozzle cooling system 100 that includes at least a first cooling subsystem 170, and in some aspects a second cooling subsystem 180, for cooling a nozzle 140 of an air-breathing engine 150 of a vehicle 160. The nozzle cooling system 100 can also include a power extraction device 130 for providing power to one or more of an air-breathing engine 150 and a vehicle 160. The air-breathing engine 150 is one or more of a supersonic (e.g., about Mach 1.3 to about Mach 5.0) engine 151 and a hypersonic (e.g., about Mach 5.0 and above) engine 152. The air-breathing engine 150 is any suitable supersonic engine 151 or hypersonic engine 152. Examples of the supersonic engine 151 include, but are not limited to, a turbofan 157, a turbojet 153, and a ramjet 155, or any combination thereof. Examples of the hypersonic engine 152 include, but are not limited to, a scramjet 154, a ramjet 155, and a combined cycle engine 158, or any combination thereof. The vehicle 160 may be any suitable vehicle such as one or more of a supersonic vehicle 161 (capable of travelling at speeds of about Mach 1.3 to about Mach 5.0) and a hypersonic vehicle 162 (capable of travelling at speeds of about Mach 5.0 and above).

The nozzle cooling system 100 includes at least one heat exchange fluid passage 169 (FIGS. 2 and 6) coupled to the nozzle 140 to cool the nozzle 140 by heat transfer. In some aspects, the nozzle cooling system 100 also includes a plurality of film cooling apertures 190 through a nozzle wall 141 of the nozzle 140 to provide film cooling of a first wall surface 142 of the nozzle wall 141, where the first wall surface 142 is subject to engine exhaust flow 159.

The nozzle cooling system 100 includes a power extraction device 130 that is configured to extract energy from a cooling fluid 111 of the nozzle cooling system 100 and produce extracted power 175 in the form of one or more of mechanical energy 131 and electrical energy 132. The power extraction device is any suitable power extraction device such as, for example, a turbine 133 or a reciprocating engine 134 (such as a steam engine) that is driven or powered by vaporized cooling fluid (e.g., cooling fluid in a gas phase). The power extraction device 130 can be referred to as one or more of a vapor powered electric generator and a vapor powered mechanical power generator. The power extraction device 130 is separate and distinct from the air-breathing engine 150 with the cooling fluid 111 being distinct and separate from the engine exhaust flow 159 until after the cooling fluid 111 is exhausted from the nozzle cooling system 100.

In accordance with the aspects of the disclosed embodiment the at least one heat exchange fluid passage 169 receives cooling fluid 111 from a fluid reservoir 110 disposed on the vehicle 160 or other suitable location at which the air-breathing engine 150 is located. The fluid reservoir 110 is refillable so that cooling fluid 111 is added at any suitable times, e.g., such as between flights or during flight, for operation of the nozzle cooling system 100. The nozzle cooling system 100 operates to achieve a thermal power balance and in some aspects includes one or more expansion valves 120 or other suitable flow control devices to maintain the upstream liquid state or improve the downstream vapor quality within the nozzle cooling system 100 and/or the power extraction device 130 and/or the exhaust flow from the nozzle cooling system 100. To control the one or more expansion valves 120, temperatures and/or pressures and/or flow rates and/or flow qualities of the cooling fluid 111 are monitored by at least one sensor 121, 122, 123, 124 of the nozzle cooling system 100. The at least one sensor 121, 122, 123, 124 provide sensor signals, representative of the cooling fluid 111 pressures and/or temperatures and/or flow rates and/or flow qualities at the respective sensor locations, to a controller 101. The controller 101 is in one aspect a controller of the vehicle 160 and/or air-breathing engine 150, while in other aspects the controller 101 is a dedicated controller for the nozzle cooling system 100. The controller is in communication with the one or more expansion valves 120 and/or coolant pump 125 to control one or more characteristics of the cooling fluid 111 flowing through the nozzle cooling system 100 to maintain thermal balance, desired cooling, vapor quality, etc., within the nozzle cooling system 100.

The nozzle cooling system 100 in accordance with the aspects of the disclosed embodiment described herein provides for cooling of the air-breathing engine 150, while also extracting power for the vehicle 160, such as power to operate, for example, a fuel pump 163 (or any suitable hydraulic pump) of the vehicle 160, the coolant pump 125 or any other suitable mechanical and/or electrical devices of the vehicle 160. In the aspects of the disclosed embodiment, large heat loads adjacent an upstream end 144 of the nozzle 140 (e.g., the highest temperature regions of the nozzle 140) are actively cooled with cooling fluid 111 (e.g., pressurized to at high pressure) and are used to generate, e.g., vehicle 160 power taking advantage of the heat of vaporization during phase change of the cooling fluid 111 from a liquid phase to a gas phase. The cooling fluid 111 in gas phase is, in some aspects, expanded through a power extraction device and in other aspects is otherwise used for power generation. In some aspects, the exhausted gas from power generation film cools the first wall surface 142 of the nozzle, while in other aspects the exhausted gas is exits the nozzle cooling system without film cooling the first wall surface 142.

The aspects of the disclosed embodiment provide for a nozzle constructed from any suitable conventional materials including, but not limited to, an austenitic nickel-chromium-based superalloy, a nickel-chromium-iron based superalloy, a ceramic composite matrix, aluminum, an aluminum alloy, titanium, a titanium alloy, steel, a steel alloy, or any combination thereof (which may or may not include ablative coatings/materials) so that the cost of the nozzle 140, the air-breathing engine 150, and/or the vehicle 160 is reduced. The aspects of the disclosed embodiment also reduce the cost of vehicle 160 maintenance and/or air-breathing engine 150 maintenance, e.g., after each vehicle excursion (e.g., flight).

Illustrative, non-exhaustive examples, which may or may not be claimed, of the subject matter according to the present disclosure are provided below.

Referring to FIGS. 1, 2, 4A, and 4B, the nozzle cooling system 100 is coupled to the nozzle 140 of the air-breathing engine 150 of vehicle 160, where engine exhaust flow 159 exits the nozzle 140 in flow direction 156. As such, the nozzle has an upstream end 144 and a downstream end 145 relative to the flow direction 156 of engine exhaust flow 159. The nozzle 140 includes nozzle wall 141 that includes the first wall surface 142 and a second wall surface 143.

The nozzle cooling system 100 includes a fluid reservoir 110 that contains cooling fluid 111, a coolant pump 125, a first cooling subsystem 170, and a power extraction device 130 coupled to the first cooling subsystem 170. The cooling fluid 111 is one or more of water, deionized water, inhibited glycol and water solutions, dielectric fluids, and/or any other suitable cooling fluid, noting that where the cooling fluid 111 is ejected into, for example, Earth's atmosphere without combusting in the engine exhaust flow 159, the cooling fluid may be biodegradable. The cooling fluid 111 is stored in the fluid reservoir 110 at any suitable temperature and pressure such as, for example, a pressure of about 14.7 psi (about 101 kPa) (in other aspects the pressure of the cooling fluid 111 within the fluid reservoir 110 may be more or less than about 14.7 psi) and a temperature of about 100° F. (about 38° C.) (in other aspects the temperature of the cooling fluid within the fluid reservoir 110 may be more or less than about 100° F.). The cooling fluid 111 within the fluid reservoir 110 is in a liquid phase and has a vapor quality of about 0% (e.g., substantially all liquid with no cooling fluid vapor present).

The coolant pump 125 is disposed between and coupled to the fluid reservoir 110 and the first cooling subsystem 170. The coolant pump 125 is configured to pressurize the cooling fluid 111 to a pressure 701A of about 3000 psi (about 20700 kPa) (in other aspects the pressure 701A may be more or less than 3000 psi) so that the cooling fluid 111 enters the first cooling subsystem 170 in a liquid phase (i.e., has a vapor quality of zero (about 100% liquid)). Pressurizing the cooling fluid 111 may also cause a temperature 702A of the cooling fluid to increase to about 100° F. (about 38° C.) (in other aspects the temperature 702A may be more or less than 100° F. and may depend on the pressure 701A of the cooling fluid 111). The first cooling subsystem 170 is coupled to the nozzle 140 so as to transfer heat from the nozzle 140 to the cooling fluid 111 (e.g., to increase a temperature of the cooling fluid 111) flowing from the fluid reservoir 110 to at least the power extraction device 130. For example, the nozzle cooling system 100 includes at least one heat exchange fluid passage 169, at least some of which are included in the first cooling subsystem 170 as a first heat exchange fluid passage 167, disposed adjacent the first wall surface 142 so as to increase a temperature of the cooling fluid 111 flowing from the fluid reservoir 110 to the power extraction device 130.

The first heat exchange fluid passage 167 has any suitable configuration for flowing cooling fluid adjacent the first wall surface 142. For example, the first heat exchange fluid passage 167 includes a coolant supply channel 200, a coolant collector 210, and one or more nozzle wall coolant passages 220 extending between and fluidically coupled to the coolant supply channel 200 and the coolant collector 210. Referring to FIG. 4A, the one or more nozzle wall coolant passages 220 (e.g., the at least one heat exchange fluid passage 169) may be disposed exterior to but coupled to the nozzle wall 141, such as to the second wall surface 143, so as to be disposed adjacent the first wall surface 142. In other aspects, referring to FIG. 4B, the one or more nozzle wall coolant passages 220 (e.g., the at least one heat exchange fluid passage 169) are disposed between the first wall surface 142 and the second wall surface 143 so as to be internal to or integral to the nozzle wall 141.

Where the one or more nozzle wall coolant passages 220 (e.g., the at least one heat exchange fluid passage 169) are disposed between the first wall surface 142 and the second wall surface 143, the first wall surface 142 and the second wall surface 143 form a pressure vessel 147 for the cooling fluid 111. In this aspect, the cooling fluid 111 flows through the at least part of the first heat exchange fluid passage in the liquid phase and is boiled, through heat transfer from the nozzle wall 141, so that at least part of the cooling fluid 111 exits the first heat exchange fluid passage 167 in a gas phase. The temperature 702B of the cooling fluid 111 exiting the first heat exchange fluid passage 167 of the first cooling subsystem 170 may be about 680° F. (about 360° C.) (in other aspects the temperature 702B may be more or less than about 680° F.) and have a pressure 701B of about 3000 psi or less (about 20700 kPa or less). The vapor quality 700B of the cooling fluid 111 exiting the first heat exchange fluid passage 167 of the first cooling subsystem 170 may be greater than about zero (100% liquid) and less than or about 100% (e.g., about 100% vapor/gas).

The cooling fluid 111, in gas phase, flows to the power extraction device 130. The power extraction device 130 is configured to extract one or more of mechanical energy 131 and electrical energy 132 from the cooling fluid 111. The cooling fluid 111 is ejected from the nozzle cooling system 100 downstream from the power extraction device 130. For example, in this aspect, the cooling fluid 111 exits the power extraction device 130 as power extraction device exhaust gas 135 and is ejected from the nozzle cooling system 100 to, for example, an atmosphere exterior to the vehicle 160. The pressure 701C of the cooling fluid 111 exiting the power extraction device 130 may be about 25 psi (about 170 kPa)

(in other aspects the pressure 701C may be more or less than about 25 psi), the temperature 702C of the cooling fluid 111 may be about 430° F. (about 220° C.) (in other aspects the temperature 702C may be more or less than about 430° F.), and the vapor quality 700C of the cooling fluid may be about 100% (in other aspects the vapor quality 700C may be less than about 100%).

Referring to FIGS. 1 and 3, in another aspect, the nozzle cooling system 100 of FIG. 2, further includes a second cooling subsystem 180 coupled to both the nozzle 140 and the first cooling subsystem 170. Here the second cooling subsystem 180 follows the power extraction device 130 and is configured to receive the cooling fluid 111 (e.g., at least in a gas phase) from the first cooling subsystem 170, e.g., through the power extraction device 130, and eject the cooling fluid 111 through the nozzle 140, as coolant exhaust 135C (e.g., power extraction device exhaust gas 135 that is directed through the second cooling subsystem 180), to effect film cooling of the first wall surface 142 of the nozzle 140 subject to engine exhaust flow 159. For example, the second cooling subsystem 180 includes a plurality of film cooling apertures 190 defined by and extending through at least the first wall surface 142. In one aspect, the plurality of film cooling apertures 190 are defined by and extend through the first wall surface 142 and the second wall surface 143. The plurality of film cooling apertures 190 eject the cooling fluid 111 (at vapor quality at or near about 100%) as coolant exhaust 135C at the first wall surface 142 to effect film cooling of the first wall surface 142. The coolant exhaust 135C may have a temperature 702C of about 430° F. (about 220° C.) (in other aspects the temperature may be more or less than about 430° F.), have a pressure of about 25 psi (about 172 kPa) (in other aspects the pressure may be more or less than about 25 psi) and have a vapor quality 700C substantially equal to vapor quality 700B (in other aspects the vapor quality 700C may be more or less than vapor quality 700B).

The second cooling subsystem 180 includes at least one fluid manifold 300 coupled to the first wall surface 142 and/or the second wall surface 143. The at least one fluid manifold 300 is in fluid communication with the plurality of film cooling apertures 190 and couples the plurality of film cooling apertures 190 to the power extraction device 130 so as to direct the power extraction device exhaust gas 135 to the plurality of film cooling apertures 190. Each of the plurality of film cooling apertures 190 has any suitable cross-sectional shape for fluid passage and ejecting the cooling fluid 111 at the first wall surface 142. For example, one or more of the plurality of film cooling apertures 190 may have a circular cross-section, a slotted or oval/rectangular cross-section, a square-cross section, a triangular cross-section or any other suitable cross-section. At least one of the plurality of film cooling apertures 190 is arranged (as shown in FIG. 3) relative to the first wall surface 142 (e.g., such as at an angle relative to the first wall surface 142) so as to eject the power extraction device exhaust gas 135 along the first wall surface 142, where the power extraction device exhaust gas 135 forms a film cooling boundary layer along the first wall surface 142. The relative positions of the at least one heat exchange fluid passage 169 and the plurality of film cooling apertures 190 in FIG. 3 (as well as FIG. 7) is exemplary only as the at least one heat exchange fluid passage 169 and the plurality of film cooling apertures 190 may have any suitable relative positions as described herein.

Referring to FIGS. 1 and 5, in another aspect, the nozzle cooling system 100 of FIG. 2, further includes an expansion valve 120. The expansion valve 120 is disposed between and coupled to the first cooling subsystem 170 and the power extraction device 130. In FIG. 5, the nozzle wall coolant passages 220 are liquid cooling passages 520, the coolant supply channel 200 is a liquid coolant supply channel 500, and the coolant collector 210 is a liquid coolant collector 510 (e.g., the wall coolant passages 210, the coolant supply channel 200, and coolant collector 210 are liquid cooling fluid passages where cooling flows in a liquid state). The expansion valve 120 may be any suitable valve, such as a throttle valve 127 (FIG. 1), which is configured to convert the cooling fluid 111 within or exiting the first cooling subsystem 170 from the liquid phase to the gas phase. For example, the expansion valve 120 flash evaporates the cooling fluid 111 as the cooling fluid 111 flows through the expansion valve 120 so as to control a vapor quality of the cooling fluid 111 within the first cooling system 170 or entering the power extraction device 130.

The expansion valve 120 may effect maintaining the pressure of the cooling fluid 111 through the first heat exchange fluid passage 167 of the first cooling subsystem 170 so that the pressure 701B of the cooling fluid exiting the first heat exchange fluid passage 167 of the first cooling subsystem 170 is substantially the same as pressure 701A. The expansion valve 120 may also effect maintaining the vapor quality of the cooling fluid 111 through the first heat exchange fluid passage 167 of the first cooling subsystem 170 so that the vapor quality 700B of the cooling fluid exiting the first heat exchange fluid passage 167 of the first cooling subsystem 170 is substantially at or near about 100%. As the cooling fluid 111 expands through the expansion valve 120, the pressure 701D and temperature 702D of the cooling fluid 111 decreases. For example, the pressure 701D may be about 200 psi (about 1380 kPa) (in other aspects the pressure may be more or less than about 200 psi) and the temperature 702D may be about 380° F. (about 190° C.) (in other aspects the temperature may be more or less than about 380° F.). The expansion valve 120 increases the vapor quality 700D of the cooling fluid to a quality greater than 0% and less than about 100% (in one aspect the vapor quality 700D is about 46% but may be higher or lower than about 46%).

Referring to FIGS. 1 and 6, in another aspect, at least one heat exchange fluid passage 169 of the nozzle cooling system 100 of FIG. 2 includes the first heat exchange fluid passage and a second heat exchange fluid passage 168. The second heat exchange fluid passage 168 may be substantially similar to the first heat exchange fluid passage 167. For example, the second heat exchange fluid passage 168 includes a coolant supply channel 600, a coolant collector 610, and one or more nozzle wall coolant passages 620 extending between and fluidically coupled to the coolant supply channel 600 and the coolant collector 610. Referring to FIG. 4A, the one or more nozzle wall coolant passages 620 (e.g., the at least one heat exchange fluid passage 169) may be disposed exterior to but coupled to the nozzle wall 141, such as to the second wall surface 143, so as to be disposed adjacent the first wall surface 142. In other aspects, referring to FIG. 4B, the one or more nozzle wall coolant passages 620 (e.g., the at least one heat exchange fluid passage 169) are disposed between the first wall surface 142 and the second wall surface 143 so as to be internal to or integral to the nozzle wall 141.

The second heat exchange fluid passage 168 is coupled to the first heat exchange fluid passage 167 and is configured to increase another temperature 702E and vapor quality 700E of the cooling fluid flowing through the second heat exchange fluid passage in gas phase. In this aspect, the cooling fluid 111 flows from the first heat exchange fluid passage 167 and is superheated by the second the second heat exchange fluid passage 168 to increase the vapor quality 700E of the cooling fluid exiting the second heat exchange fluid passage 168 to about 100% (e.g., about 100% vapor) (in other aspects the vapor quality 700E may be less than about 100%). The temperature of the cooling fluid 111 exiting the second heat exchange fluid passage 168 may be increased by the second heat exchange fluid passage 168 to a temperature 702E of about 700° F. (about 370° C.) (in other aspects the temperature 702E may be more or less than about 700° F.). The pressure 701E of the cooling fluid exiting the second heat exchange fluid passage 168 may be substantially the same as the pressure 701B of the cooling fluid exiting the first heat exchange fluid passage 167 (in other aspects the pressure 701E may be more or less than pressure 701B).

Referring to FIGS. 1, 6, and 11-14, the first heat exchange fluid passage 167 (e.g., in the aspect illustrated in FIG. 6, the first heat exchange passage 167 is at least partially a liquid cooling passage 520) of the first cooling subsystem 170 and the second heat exchange fluid passage 168 (e.g., a gaseous cooling passage 620) of the second cooling subsystem 180 may have any suitable positional relationship with respect to each other. For example, the first heat exchange fluid passage 167 and the second heat exchange fluid passage 168 are interdigitated (e.g., collocated; placed side by side so one of the first heat exchange fluid passage 167 is disposed between two of the second heat exchange fluid passage 168 or vice versa) with each other as illustrated in FIGS. 11, 12, 13, and 14. In other aspects, the first heat exchange fluid passage 167 and the second heat exchange fluid passage 168 are arranged in series (e.g., collocated; placed side by side where one or more of the first heat exchange fluid passage 167 is upstream or downstream, relative to the flow direction 156, from one or more of the second heat exchange fluid passage 168) as illustrated in FIG. 14.

In another aspect, the at least one heat exchange fluid passage 169 (e.g., one or more of the first heat exchange fluid passage 167 and the second heat exchange fluid passage 168) comprises at least a substantially linear fluid passage 1100 (FIG. 11) extending between the upstream end 144 and the downstream end 145 of the nozzle wall 141. In still another aspect, the at least one heat exchange fluid passage 169 (e.g., one or more of the first heat exchange fluid passage 167 and the second heat exchange fluid passage 168) comprises at least a serpentine fluid passage 1600 (see FIG. 15, which illustrates a portion of a nozzle 140 of a hypersonic engine 152; and FIG. 16, which illustrates a nozzle 140 of a supersonic engine 151) extending between the upstream end 144 and the downstream end 145 of the nozzle wall 141. In still other aspects, the configurations of the at least one heat exchange fluid passage 169 (e.g., one or more of the first heat exchange fluid passage 167 and the second heat exchange fluid passage 168) may be combined in any suitable manner. For example, a portion of the at least one heat exchange fluid passage 169 may be serpentine and another portion may be substantially linear and/or have any suitable shape extending through or adjacent the nozzle 141 wall.

In one aspect, an interior surface 1201 of the at least one heat exchange fluid passage 169 (e.g., one or more of the first heat exchange fluid passage 167 and the second heat exchange fluid passage 168) may be substantially smooth (e.g., substantially no protrusions—see, e.g., FIG. 12). In another aspect, the at least one heat exchange fluid passage 169 (e.g., one or more of the first heat exchange fluid passage 167 and the second heat exchange fluid passage 168) includes one or more heat transfer protrusions 1200 (FIG. 12) extending from the interior surface 1201 of the at least one heat exchange fluid passage 169 so as to increase the heat transfer area of the at least one heat exchange fluid passage 169. The one or more heat transfer protrusions 1200 may have any suitable configuration including, but not limited to, one or more of pins and fins.

The aspects of the disclosed embodiments illustrated in FIGS. 2-6 may be combined with each other in any suitable manner. For example, referring to FIGS. 1 and 7, the expansion valve 120 of FIG. 5 and the plurality of film cooling apertures 190 of FIG. 3 are added to the nozzle cooling system illustrated in FIG. 6. In FIG. 7, the expansion valve 120 is disposed within the first cooling subsystem 170 between the coolant collector 210, which in this aspect, is a liquid coolant collector 510, and the coolant supply channel 600, which is a gaseous coolant supply channel. In FIG. 7, the nozzle wall coolant passages 220 are liquid cooling passages 520, the coolant supply channel 200 is a liquid coolant supply channel 500, and the coolant collector 210 is a liquid coolant collector 510 (e.g., the wall coolant passages 210, the coolant supply channel 200 and coolant collector 210 are liquid cooling fluid passages where cooling flows in a liquid state). In FIG. 7, the coolant supply channel 600, the coolant collector 610, and the nozzle wall coolant passages 620 are gaseous cooling fluid passages where cooling fluid 111 flows in a gaseous state. In FIG. 7, the expansion valve 120 at least partially controls the quality of the cooling fluid 111 in gas phase flowing to the second heat exchange fluid passage 168. The plurality of film cooling apertures 190 ejects the power extraction device exhaust gas 135 along the first wall surface of the nozzle 140. In this aspect, the temperatures, pressures and vapor qualities may be provided as described above; however, the pressure 701E exiting the second heat exchange fluid passage 168 may be substantially the same as pressure 701D exiting the expansion valve (in other aspects the pressure 701E may be more or less than the pressure 701D).

Referring to FIGS. 1 and 8-14, the at least one heat exchange fluid passage 169 (inclusive of the first heat exchange fluid passage 167 and the second heat exchange fluid passage 168) may have any suitable positional relationship with the plurality of film cooling apertures 190 relative to the flow direction 156 of engine exhaust flow 159 through the nozzle 140. The following are non-limiting examples of the suitable positional relationship between the at least one heat exchange fluid passage 169 and the plurality of film cooling apertures 190. In one aspect, one or more of the at least one heat exchange fluid passage 169 is disposed upstream of one or more of the plurality of film cooling apertures 190 relative to the flow direction 156 of the engine exhaust flow 159 (FIGS. 8, 10, and 12). In another aspect, one or more of the at least one heat exchange fluid passage 169 is disposed downstream of one or more of the plurality of film cooling apertures 190 relative to the flow direction 156 of the engine exhaust flow 159 (FIGS. 9 and 10). In another aspect, one or more of the plurality of film cooling apertures 190 is disposed upstream of one or more of the at least one heat exchange fluid passage 169 relative to a flow direction of the engine exhaust flow (FIGS. 9, 10, and 13). In yet another aspect, one or more of the plurality of film cooling apertures 190 is disposed downstream of one or more of the at least one heat exchange fluid passage 169 relative to the flow direction 156 of the engine exhaust flow 159 (FIGS. 8, 10, and 12).

In one aspect, the at least one heat exchange fluid passage 169 and the plurality of film cooling apertures 190 are alternately arranged relative to each other in a direction transverse to the flow direction 156 of the engine exhaust flow 159 (FIGS. 10 and 14). The at least one heat exchange fluid passage 169 and the plurality of film cooling apertures 190 may also be alternately arranged relative to each other in a direction substantially parallel with the flow direction 156 of the engine exhaust flow 159 (FIG. 11). The at least one heat exchange fluid passage 169 and the plurality of film cooling apertures 190 are, in one aspect, collocated along a common portion of the nozzle wall 141 of the nozzle 140 as illustrated in, e.g., FIGS. 10, 11, and 14. The at least one heat exchange fluid passage 169 and the plurality of film cooling apertures 190 may also be arranged in series relative to each other as illustrated in, e.g., FIGS. 8, 9, 12, and 13.

Referring to FIGS. 17 and 18, a concentration (e.g., number or area density of apertures 1800 of the plurality of film cooling apertures 190 and/or number or area density of fluid passages 1700 of the at least one heat exchange fluid passage 169) of one or more of the at least one heat exchange fluid passage 169 and the plurality of film cooling apertures 190 is greater adjacent the upstream end 144 of the nozzle wall 141 of the nozzle 140 than adjacent the downstream end 145 of the nozzle wall 141 of the nozzle 140. For example, the distance 1701 between the fluid passages 220 (or 520), 620 of the at least one heat exchange fluid passage 169, in the flow direction 156, increases by a factor n (e.g., n1, n2, n3, . . . ) or by any other suitable amount as the position of the respective fluid passages 220 (or 520), 620 approach the downstream end 145 of the nozzle wall 141. The distance 1801 between the each of the plurality of film cooling apertures 190, in the flow direction 156, increases by a factor m (e.g., m1, m2, m3, . . . ) or by any other suitable amount as the position of the respective apertures of the plurality of film cooling apertures 190 approach the downstream end 145 of the nozzle wall 141.

Referring to FIGS. 1, 2, 3, 5, 6, and 7, the nozzle cooling system 100 includes at least one sensor 121, 122, 123, 124 configured to sense one or more of a temperature 702A-702E, a pressure 701A-701E, and a vapor quality 700B-700E of the cooling fluid 111 within one or more of the first cooling subsystem 170 and the second cooling subsystem 180 and the controller 101. One or more of the at least one sensor 121 (e.g., sensors 121A, 121B, 123C, 123D) is coupled to the first cooling subsystem 170 for sensing at least one or more of the temperature, pressure, and vapor quality of the cooling fluid 111 within the first cooling subsystem 170. One or more of the at least one sensor 124 is coupled to the power extraction device for sensing at least one or more of the temperature, pressure, and vapor quality of the cooling fluid 111 flowing through the power extraction device 130. One or more of the at least one sensor 123 is coupled to the second cooling subsystem 180 for sensing at least one or more of the temperature, pressure, and vapor quality of the cooling fluid 111 within the second cooling subsystem 180. One or more of the at least one sensor 122 (e.g., sensors 122A, 122B) is coupled to the nozzle 140 for sensing a temperature of the nozzle 140 at one or more locations of the nozzle wall 141. FIGS. 2, 3, 5, 6, and 7 illustrate exemplary locations of the at least one sensor 121, 122, 123 however, in other aspects the at least one sensor 121, 122, 123 may be placed at any suitable location(s) of the nozzle cooling system 100.

The controller 101 is coupled to the at least one sensor 121, 122, 123, 124 and one or more of the coolant pump 125 and expansion valve 120. The controller is configured to control one or more of the coolant pump 125 and the expansion valve 120 based on signals received from the at least one sensor 121, 122, 123, 124. For example, the controller 101 effects, with the coolant pump 125, control of one or more of a cooling fluid 111 characteristics, such as cooling fluid 111 flow speed 250 (FIG. 2) through the nozzle cooling system 100, a cooling fluid 111 mass flow rate 252 (FIG. 2) through the nozzle cooling system 100, the temperature 702A-702E of the cooling fluid 111 at one or more locations within the nozzle cooling system 100, the pressure 701A-701E of the cooling fluid 111 at one or more locations within the nozzle cooling system 100, and the vapor quality 700B-700E of the cooling fluid 111 at one or more locations within the nozzle cooling system 100, or any other suitable characteristics of the cooling fluid.

The expansion valve 120 is coupled to the controller 101 and is disposed between, so as to be in fluid communication with, the first cooling subsystem 170 and the second cooling subsystem 180, where the controller 101 effects, with the expansion valve 120, conversion of the cooling fluid 111 from the liquid phase to the gas phase based on the signals received from the at least one sensor 121, 122, 123, 124. For example, the controller 101 controls cooling fluid 111 characteristics such as one or more of the vapor quality 700B-700E of the cooling fluid 111 at one or more locations within the nozzle cooling system 100, the cooling fluid 111 flow speed 250 (FIG. 2) through the nozzle cooling system 100, the cooling fluid 111 mass flow rate 252 (FIG. 2) through the nozzle cooling system 100, or any other suitable characteristics of the cooling fluid 111 by, e.g., opening and closing (adjusting) the expansion valve 120.

Referring to FIGS. 1 and 19, an exemplary method for operating the air-breathing engine 150 will be described in accordance with aspects of the disclosed embodiment. The method includes transferring heat to the cooling fluid 111 (as described above) from the nozzle 140 of the air-breathing engine 150 using the first cooling subsystem 170 of the nozzle cooling system 100 coupled to the nozzle 140 (FIG. 19, Block 1900), where the cooling fluid 111 flows from the fluid reservoir 110 through the first cooling subsystem 170 to at least the power extraction device 130. The cooling fluid 111 is received from the first cooling subsystem 170 in the second cooling subsystem 180 (FIG. 19. Block 1905), of the nozzle cooling system 100, coupled to both the nozzle 140 and the first cooling subsystem 170. The temperature of the cooling fluid 111 flowing, in liquid phase, through at least one first heat exchange fluid passage 167 of the first cooling subsystem 170 is increased, and another temperature of the cooling fluid 111 flowing, in gas phase, through at least one second heat exchange fluid passage 168 of the second cooling subsystem 180 that is coupled to the first heat exchange fluid passage 167 is also increased. The cooling fluid 111 is converted from the liquid phase to a gas phase with the expansion valve 120 disposed between and coupled to the first cooling subsystem 170 and the second cooling subsystem 180. The second cooling subsystem 180 includes the power extraction device 130 and energy is extracted from the cooling fluid 111 with the second cooling subsystem 180 (FIG. 19, Block 1910). The energy extracted from the cooling fluid 111 is converted to one or more of mechanical energy 131 and electrical energy 132 with the power extraction device 130.

The method includes ejecting the cooling fluid 111 from the nozzle cooling system 100 downstream from the power extraction device 130 (FIG. 19, Block 1930). For example, the cooling fluid 111 is from the second cooling subsystem 180 through the nozzle 140 effecting film cooling of the first wall surface 142 of the nozzle 140 subject to engine exhaust flow 159. The cooling fluid 111 is ejected through the plurality of film cooling apertures 190 of the second cooling subsystem 180 that are defined by and extend through at least the first wall surface 142.

The method may also include sensing, with at least one sensor 121, 122, 123, 124, one or more of a temperature, pressure, and vapor quality of the cooling fluid 111 (e.g., cooling fluid characteristics) (FIG. 19, Block 1920) within one or more of the first cooling subsystem 170 and the second cooling subsystem 180, where the controller 101 controls coolant pump and/or expansion valve 120 based on signals received from the at least one sensor.

Referring to FIGS. 1 and 20, an exemplary method for operating the vehicle 160 will be described in accordance with aspects of the disclosed embodiment. The method includes transferring heat to the cooling fluid 111 (as described above) from the nozzle 140 of the air-breathing engine 150 of the vehicle 160 using the first cooling subsystem 170 of the nozzle cooling system 100 coupled to the nozzle 140 (FIG. 20, Block 2000), where the cooling fluid 111 flows from the fluid reservoir 110 through the first cooling subsystem 170 to at least the power extraction device 130. The temperature of the cooling fluid 111 flowing, in liquid phase, through at least one first heat exchange fluid passage 167 of the first cooling subsystem 170 is increased, and another temperature of the cooling fluid 111 flowing, in gas phase, through at least one second heat exchange fluid passage 168 of the second cooling subsystem 180 that is coupled to the first heat exchange fluid passage 167 is also increased. The cooling fluid 111 is converted from the liquid phase to a gas phase with the expansion valve 120 disposed between and coupled to the first cooling subsystem 170 and the second cooling subsystem 180. Energy is extracted from the cooling fluid 111 with the power extraction device (FIG. 20, Block 2010). The energy extracted from the cooling fluid 111 is converted to one or more of mechanical energy 131 and electrical energy 132 with the power extraction device 130.

The method includes ejecting the cooling fluid 111 from the nozzle cooling system 100 downstream from the power extraction device 130 (FIG. 20, Block 2030). For example, the cooling fluid 111 is ejected from the second cooling subsystem 180 through the nozzle 140 effecting film cooling of the first wall surface 142 of the nozzle 140 subject to engine exhaust flow 159. The cooling fluid 111 is ejected through the plurality of film cooling apertures 190 of the second cooling subsystem 180 that are defined by and extend through at least the first wall surface 142. The cooling fluid 111 is received from the first cooling subsystem 170 in the second cooling subsystem 180 and the ejected cooling fluid is placed relative to the first wall surface 142 so as to shield the first wall surface 142 and, at least in part, form the second cooling subsystem 180 of the nozzle cooling system 100 (FIG. 20, Block 2040).

The method may also include sensing, with at least one sensor 121, 122, 123, 124, one or more of a temperature, pressure, and vapor quality of the cooling fluid 111 (e.g., cooling fluid characteristics) (FIG. 20, Block 2020) within one or more of the first cooling subsystem 170 and the second cooling subsystem 180, where the controller 101 controls coolant pump and/or expansion valve 120 based on signals received from the at least one sensor.

The following are provided in accordance with the aspects of the present disclosure:

A1. A nozzle wall for an air-breathing engine, the nozzle wall comprising:
a first wall surface subject to engine exhaust flow;
a nozzle cooling system including at least one heat exchange fluid passage disposed adjacent the first wall surface so as to increase a temperature of a cooling fluid flowing from a fluid reservoir to at least a power extraction device; and
wherein the cooling fluid is ejected from the nozzle cooling system downstream from the power extraction device.

A2. The nozzle wall of paragraph A1, wherein the nozzle cooling system further includes a plurality of film cooling apertures defined by and extending through at least the first wall surface so that the plurality of film cooling apertures eject the cooling fluid as power extraction device exhaust gas at the first wall surface to provide film cooling of the first wall surface.

A3. The nozzle wall of paragraph A2, further comprising a second wall surface wherein the plurality of film cooling apertures are defined by and extend through the first wall surface and the second wall surface.

A4. The nozzle wall of paragraph A2, further comprising a second wall surface wherein the at least one heat exchange fluid passage is disposed between the first wall surface and the second wall surface.

A5. The nozzle wall of paragraph A2, further comprising at least one fluid manifold coupled to a second wall surface, the at least one fluid manifold being in fluid communication with the plurality of film cooling apertures.

A6. The nozzle wall of paragraph A2, wherein at least one of the plurality of film cooling apertures is arranged relative to the first wall surface so as to eject the power extraction device exhaust gas along the first wall surface.

A7. The nozzle wall of paragraph A2 (and/or paragraphs A3-A6), wherein one or more of the at least one heat exchange fluid passage is disposed upstream of one or more of the plurality of film cooling apertures relative to a flow direction of the engine exhaust flow.

A8. The nozzle wall of paragraph A2 (and/or paragraphs A3-A6), wherein one or more of the at least one heat exchange fluid passage is disposed downstream of one or more of the plurality of film cooling apertures relative to a flow direction of the engine exhaust flow.

A9. The nozzle wall of paragraph A2 (and/or paragraphs A3-A6), wherein one or more of the plurality of film cooling apertures is disposed upstream of one or more of the at least one heat exchange fluid passage relative to a flow direction of the engine exhaust flow.

A10. The nozzle wall of paragraph A2 (and/or paragraphs A3-A6), wherein one or more of the plurality of film cooling apertures is disposed downstream of one or more of the at least one heat exchange fluid passage relative to a flow direction of the engine exhaust flow.

A11. The nozzle wall of paragraph A2 (and/or paragraphs A3-A6), wherein the at least one heat exchange fluid passage and the plurality of film cooling apertures are alternately arranged relative to each other in a direction transverse to a flow direction of the engine exhaust flow.

A12. The nozzle wall of paragraph A2 (and/or paragraphs A3-A6), wherein the at least one heat exchange fluid passage and the plurality of film cooling apertures are alternately arranged relative to each other in a direction substantially parallel with a flow direction of the engine exhaust flow.

A13. The nozzle wall of paragraph A2 (and/or paragraphs A3-A6), wherein the at least one heat exchange fluid passage and the plurality of film cooling apertures are collocated along a common portion of the nozzle wall.

A14. The nozzle wall of paragraph A2 (and/or paragraphs A3-A6), wherein the at least one heat exchange fluid passage and the plurality of film cooling apertures are arranged in series relative to each other.

A15. The nozzle wall of paragraph A1 (and/or paragraphs A2-A14), further comprising:
an upstream end, relative to a flow direction of the engine exhaust flow, defined at least by the first wall surface; and
a downstream end defined at least by the first wall surface and disposed downstream from the upstream end.

A16. The nozzle wall of paragraph A15 (and/or paragraphs A2-A14), wherein the at least one heat exchange fluid passage comprises a first heat exchange fluid passage and a second heat exchange fluid passage, where
the first heat exchange fluid passage is configured to increase the temperature of the cooling fluid flowing through the first heat exchange fluid passage in liquid phase, and
the second heat exchange fluid passage is coupled to the first heat exchange cooling passage and is configured to increase another temperature of the cooling fluid flowing through the second heat exchange fluid passage in gas phase.

A17. The nozzle wall of paragraph A16, wherein the first heat exchange fluid passage and the second heat exchange fluid passage are interdigitated with each other.

A18. The nozzle wall of paragraph A1 (and/or paragraphs A3-A17), wherein the at least one heat exchange fluid passage comprises at least a substantially linear fluid passage extending between an upstream end and a downstream end of the nozzle wall.

A19. The nozzle wall of paragraph A1 (and/or paragraphs A2-A17), wherein the at least one heat exchange fluid passage comprises at least a serpentine fluid passage extending between an upstream end and a downstream end of the nozzle wall.

A20. The nozzle wall of paragraph A1 (and/or paragraphs A2-A19), wherein a concentration of one or more of the at least one heat exchange fluid passage and the plurality of film cooling apertures is greater adjacent an upstream end of the nozzle wall than adjacent a downstream end of the nozzle wall.

A21. The nozzle wall of paragraph A1, further comprising at least one fluid manifold coupled to the first wall surface, the at least one fluid manifold being in fluid communication with the plurality of film cooling apertures.

A22. The nozzle wall of paragraph A1 (and/or paragraphs A2-A21), further comprising a second wall surface, wherein the first wall surface and the second wall surface form a pressure vessel for the cooling fluid.

A23. The nozzle wall of paragraph A1 (and/or paragraphs A2-A22), wherein at least the first wall surface of the nozzle comprises an austenitic nickel-chromium-based superalloy, a nickel-chromium-iron based superalloy, a ceramic matrix composite, aluminum, an aluminum alloy, titanium, a titanium alloy, steel, or a steel alloy.

A24. The nozzle wall of paragraph A1 (and/or paragraphs A2-A23), wherein the at least one heat exchange fluid passage includes heat transfer protrusions extending from an interior surface of the at least one heat exchange fluid passage.

A25. The nozzle wall of paragraph A24, wherein the heat transfer protrusions include one or more of pins and fins.

B1. An air-breathing engine comprising:
a nozzle;
a nozzle cooling system including a first cooling subsystem coupled to the nozzle so as to transfer heat from the nozzle to a cooling fluid flowing from a fluid reservoir to at least a power extraction device; and
wherein the cooling fluid is ejected from the nozzle cooling system downstream from the power extraction device.

B2. The air-breathing engine of paragraph B1, wherein:
the nozzle includes the first wall surface; and
the first cooling subsystem includes at least one heat exchange fluid passage disposed adjacent the first wall surface so as to increase the temperature of the cooling fluid flowing from the fluid reservoir to the power extraction device.

B3. The air-breathing engine of paragraph B1 (and/or paragraph B2), wherein the nozzle cooling system further includes a second cooling subsystem coupled to both the nozzle and the first cooling subsystem, where the second cooling subsystem is configured to
receive the cooling fluid from the first cooling subsystem, where at least a temperature of the cooling fluid is reduced by the power extraction device, and
eject the cooling fluid through the nozzle to effect film cooling of a first wall surface of the nozzle subject to engine exhaust flow.

B4. The air-breathing engine of paragraph B3, wherein the second cooling subsystem includes a plurality of film cooling apertures defined by and extending through at least the first wall surface so that the plurality of film cooling apertures eject the cooling fluid in the form of coolant exhaust at the first wall surface to effect film cooling of the first wall surface of the nozzle.

B5. The air-breathing engine of paragraph B4, further comprising a second wall surface wherein the plurality of film cooling apertures are defined by and extend through the first wall surface and the second wall surface.

B6. The air-breathing engine of paragraph B5, wherein the first wall surface and a second wall surface of the nozzle form a pressure vessel for the cooling fluid.

B7. The air-breathing engine of paragraph B4, further comprising a second wall surface wherein the at least one heat exchange fluid passage is disposed between the first wall surface and the second wall surface.

B8. The air-breathing engine of paragraph B4, further comprising at least one fluid manifold coupled to the second wall surface, the at least one fluid manifold being in fluid communication with the plurality of film cooling apertures.

B9. The air-breathing engine of paragraph B4, wherein at least one of the plurality of film cooling apertures is arranged relative to the first wall surface so as to eject the power extraction device exhaust gas along the first wall surface.

B10. The air-breathing engine of paragraph B4 (and/or paragraphs B5-B9) wherein, the first cooling subsystem includes at least one first heat exchange fluid passage configured to increase the temperature of the cooling fluid flowing through the at least one first heat exchange fluid passage in liquid phase.

B11. The air-breathing engine of paragraph B10, wherein one or more of the at least one heat exchange fluid passage is disposed upstream of one or more of the plurality of film cooling apertures relative to a flow direction of engine exhaust flow through the nozzle.

B12. The air-breathing engine of paragraph B10, wherein one or more of the at least one heat exchange fluid passage is disposed downstream of one or more of the plurality of film cooling apertures relative to a flow direction of engine exhaust flow through the nozzle.

B13. The air-breathing engine of paragraph B10, wherein one or more of the plurality of film cooling apertures is disposed upstream of one or more of the at least one heat exchange fluid passage relative to a flow direction of engine exhaust flow through the nozzle.

B14. The air-breathing engine of paragraph B10, wherein one or more of the plurality of film cooling apertures is disposed downstream of one or more of the at least one heat exchange fluid passage relative to a flow direction of engine exhaust flow through the nozzle.

B15. The air-breathing engine of paragraph B10, wherein the at least one heat exchange fluid passage and the plurality of film cooling apertures are alternately arranged relative to each other in a direction transverse to a flow direction of engine exhaust flow through the nozzle.

B16. The air-breathing engine of paragraph B10, wherein the at least one heat exchange fluid passage and the plurality of film cooling apertures are alternately arranged relative to each other in a direction substantially parallel with a flow direction of engine exhaust flow through the nozzle.

B17. The air-breathing engine of paragraph B10 (and/or paragraphs B11-B16), wherein the at least one heat exchange fluid passage and the plurality of film cooling apertures are collocated along a common portion of the nozzle wall.

B18. The air-breathing engine of paragraph B10 (and/or paragraphs B11-B17), wherein the at least one heat exchange fluid passage and the plurality of film cooling apertures are arranged in series relative to each other.

B19. The air-breathing engine of paragraph B1 (and/or paragraphs B2-B18), wherein:
the first cooling subsystem includes at least one first heat exchange fluid passage configured to increase the temperature of the cooling fluid flowing through the at least one first heat exchange fluid passage in liquid phase, and
the second cooling subsystem includes at least one second heat exchange fluid passage coupled to the first heat exchange cooling passage and is configured to increase another temperature of the cooling fluid flowing through the at least one second heat exchange fluid passage in gas phase.

B20. The air-breathing engine of paragraph B19, wherein the first heat exchange fluid passage and the second heat exchange fluid passage are interdigitated with each other.

B21. The air-breathing engine of paragraph B19 (and/or paragraphs B20-B20), wherein one or more of the at least one first heat exchange fluid passage and the at least one second heat exchange fluid passage comprises at least a substantially linear fluid passage extending between an upstream end of the nozzle and a downstream end of the nozzle relative to a flow direction of engine exhaust flow through the nozzle.

B22. The air-breathing engine of paragraph B19 (and/or paragraphs B20-B20), wherein one or more of the at least one first heat exchange fluid passage and the at least one second heat exchange fluid passage comprises at least a serpentine fluid passage extending between the upstream end of the nozzle and a downstream end of the nozzle relative to a flow direction of engine exhaust flow through the nozzle.

B23. The air-breathing engine of paragraph B19 (and/or paragraphs B20-B22), wherein a concentration of one or more of the at least one first heat exchange fluid passage and the at least one second heat exchange fluid passage is greater adjacent an upstream end of the nozzle than adjacent a downstream end of the nozzle relative to a flow direction of engine exhaust flow through the nozzle.

B24. The air-breathing engine of paragraph B1 (and/or paragraphs B2-B23), wherein at least the first wall surface of the nozzle comprises an austenitic nickel-chromium-based superalloy, a nickel-chromium-iron based superalloy, a ceramic matrix composite, aluminum, an aluminum alloy, titanium, a titanium alloy, steel, or a steel alloy.

B25. The air breathing engine of paragraph B1 (and/or paragraphs B2-B24), wherein the cooling fluid is one or more of water, deionized water, inhibited glycol and water solutions, and dielectric fluids.

B26. The air breathing engine of paragraph B1 (and/or paragraphs B2-B25), further comprising a coolant pump disposed between and coupled to the fluid reservoir and the first cooling subsystem, the coolant pump being configured to pressurize the cooling fluid.

B27. The air breathing engine of paragraph B1 (and/or paragraphs B2-B26), further comprising an expansion valve disposed between and coupled to the first cooling subsystem and the second cooling subsystem, wherein the expansion valve is configured to convert the cooling fluid from a liquid phase to a gas phase.

B28. The air-breathing engine of paragraph B1 (and/or paragraphs B2-B26), further comprising:
at least one sensor configured to sense one or more of a temperature, pressure, and vapor quality of the cooling fluid within one or more of the first cooling subsystem, the second cooling subsystem, and the power extraction device; and
a controller coupled to the coolant pump and the at least one sensor, the controller being configured to control the coolant pump based on signals received from the at least one sensor.

B29. The air-breathing engine of paragraph B29, wherein the controller effects, with the coolant pump, control of one or more of a cooling fluid flow speed, an amount of cooling fluid entering the first cooling subsystem, a cooling fluid mass flow rate, a temperature of the cooling fluid, and a pressure of the cooling fluid.

B30. The air-breathing engine of paragraph B29, further comprising:
an expansion valve coupled to the controller and being disposed between, so as to be in fluid communication with, the first cooling subsystem and the second cooling subsystem;
wherein the controller effects, with the expansion valve, conversion of the cooling fluid from a liquid phase to a gas phase based on the signals received from the at least one sensor.

B31. The air-breathing engine of paragraph B29, wherein one or more of the at least one sensor is coupled to the nozzle for sensing a temperature of the nozzle.

B32. The air-breathing engine of paragraph B29 (and/or paragraph B31), wherein one or more of the at least one sensor is coupled to the first cooling subsystem for sensing at least one or more of a temperature, pressure, and vapor quality of the cooling fluid within the first cooling subsystem.

B33. The air-breathing engine of paragraph B29 (and/or paragraphs B31-B32), wherein one or more of the at least one sensor is coupled to the second cooling subsystem for sensing at least one or more of a temperature, pressure, and vapor quality of the cooling fluid within the second cooling subsystem.

B34. The air-breathing engine of paragraph B29 (and/or paragraphs B31-B33), wherein one or more of the at least one sensor is coupled to the power extraction device for sensing at least one or more of a temperature, pressure, and vapor quality of the cooling fluid flowing through the power extraction device.

B35. The air-breathing engine of paragraph B1 (and/or paragraphs B2-B34), wherein the power extraction device is configured to extract energy from the cooling fluid and produce one or more of mechanical energy and electrical energy therefrom.

B36. The air-breathing engine of paragraph B1 (and/or paragraphs B2-B34) wherein the power extraction device comprises a turbine.

B37. The air-breathing engine of paragraph B1 (and/or paragraphs B2-B35), wherein the power extraction device is one or more of a vapor powered electric generator and a vapor powered mechanical power generator.

B38. The air-breathing engine of paragraph B1 (and/or paragraphs B2-B35) wherein the power extraction device comprises a reciprocating engine.

B39. The air-breathing engine of paragraph B1 (and/or paragraphs B2-B38), wherein the first cooling subsystem includes at least one heat exchange fluid passage having heat transfer protrusions extending from an interior surface of the at least one heat exchange fluid passage.

B40. The air-breathing engine of paragraph B39, wherein the heat transfer protrusions include one or more of pins and fins.

B41. The air-breathing engine of paragraph B1 (and/or paragraphs B2-B40), wherein the air-breathing engine comprises one or more of a supersonic engine and a hypersonic engine.

B42. The air-breathing engine of paragraph B1 (and/or paragraphs B2-B40), wherein the air-breathing engine comprises one or more of a turbofan, turbojet, a ramjet, a combined cycle engine, and a scramjet.

C1. A vehicle comprising:
an air-breathing engine having a nozzle where engine exhaust flow exits the air-breathing engine through the nozzle;
a nozzle cooling system including a first cooling subsystem coupled to the nozzle so as to transfer heat from the nozzle to a cooling fluid flowing from a fluid reservoir to at least a power extraction device; and
wherein the cooling fluid is ejected from the nozzle cooling system downstream from the power extraction device.

C2. The vehicle of paragraph C1, wherein:
the nozzle includes the first wall surface; and
the first cooling subsystem includes at least one heat exchange fluid passage disposed adjacent the first wall surface so as to increase the temperature of the cooling fluid flowing from the fluid reservoir to the power extraction device.

C3. The vehicle of paragraph C1 (and/or paragraph C2), wherein the nozzle cooling system further includes a second cooling subsystem coupled to both the nozzle and the first cooling subsystem, where the second cooling subsystem is configured to
receive the cooling fluid from the first cooling subsystem, where at least a temperature of the cooling fluid is reduced by the power extraction device, and
eject the cooling fluid through the nozzle to effect film cooling of a first wall surface of the nozzle subject to engine exhaust flow.

C4. The vehicle of paragraph C3, wherein the second cooling subsystem includes a plurality of film cooling apertures defined by and extending through at least the first wall surface so that the plurality of film cooling apertures eject the cooling fluid in the form of coolant exhaust at the first wall surface to effect film the cooling of the first wall surface of the nozzle.

C5. The vehicle of paragraph C4, further comprising a second wall surface wherein the plurality of film cooling apertures are defined by and extend through the first wall surface and the second wall surface.

C6. The vehicle of paragraph C5, wherein the first wall surface and a second wall surface of the nozzle form a pressure vessel for the cooling fluid.

C7. The vehicle of paragraph C4, further comprising a second wall surface wherein the at least one heat exchange fluid passage is disposed between the first wall surface and the second wall surface.

C8. The vehicle of paragraph C4, further comprising at least one fluid manifold coupled to the second wall surface, the at least one fluid manifold being in fluid communication with the plurality of film cooling apertures.

C9. The vehicle of paragraph C4, wherein at least one of the plurality of film cooling apertures is arranged relative to the first wall surface so as to eject the power extraction device exhaust gas along the first wall surface.

C10. The vehicle of paragraph C4 (and/or paragraphs C5-C9) wherein, the first cooling subsystem includes at least one first heat exchange fluid passage configured to increase the temperature of the cooling fluid flowing through the at least one first heat exchange fluid passage in liquid phase.

C11. The vehicle of paragraph C10, wherein one or more of the at least one heat exchange fluid passage is disposed upstream of one or more of the plurality of film cooling apertures relative to a flow direction of engine exhaust flow through the nozzle.

C12. The vehicle of paragraph C10, wherein one or more of the at least one heat exchange fluid passage is disposed downstream of one or more of the plurality of film cooling apertures relative to a flow direction of engine exhaust flow through the nozzle.

C13. The vehicle of paragraph C10, wherein one or more of the plurality of film cooling apertures is disposed upstream of one or more of the at least one heat exchange fluid passage relative to a flow direction of engine exhaust flow through the nozzle.

C14. The vehicle of paragraph C10, wherein one or more of the plurality of film cooling apertures is disposed downstream of one or more of the at least one heat exchange fluid passage relative to a flow direction of engine exhaust flow through the nozzle.

C15. The vehicle of paragraph C10, wherein the at least one heat exchange fluid passage and the plurality of film cooling apertures are alternately arranged relative to each other in a direction transverse to a flow direction of engine exhaust flow through the nozzle.

C16. The vehicle of paragraph C10, wherein the at least one heat exchange fluid passage and the plurality of film cooling apertures are alternately arranged relative to each other in a direction substantially parallel with a flow direction of engine exhaust flow through the nozzle.

C17. The vehicle of paragraph C10 (and/or paragraphs C11-C16), wherein the at least one heat exchange fluid passage and the plurality of film cooling apertures are collocated along a common portion of the nozzle wall.

C18. The vehicle of paragraph C10 (and/or paragraphs C11-C16), wherein the at least one heat exchange fluid passage and the plurality of film cooling apertures are arranged in series relative to each other.

C19. The vehicle of paragraph C1 (and/or paragraphs C2-C18), wherein:

the first cooling subsystem includes at least one first heat exchange fluid passage configured to increase the temperature of the cooling fluid flowing through the at least one first heat exchange fluid passage in liquid phase, and the second cooling subsystem includes at least one second heat exchange fluid passage coupled to the first heat exchange cooling passage and is configured to increase another temperature of the cooling fluid flowing through the at least one second heat exchange fluid passage in gas phase.

C20. The vehicle of paragraph C19, wherein the first heat exchange fluid passage and the second heat exchange fluid passage are interdigitated with each other.

C21. The vehicle of paragraph C19 (and/or paragraphs C20-C21), wherein one or more of the at least one first heat exchange fluid passage and the at least one second heat exchange fluid passage comprises at least a substantially linear fluid passage extending between an upstream end of the nozzle and a downstream end of the nozzle relative to a flow direction of engine exhaust flow through the nozzle.

C22. The vehicle of paragraph C19 (and/or paragraphs C20-C21), wherein one or more of the at least one first heat exchange fluid passage and the at least one second heat exchange fluid passage comprises at least a serpentine fluid passage extending between the upstream end of the nozzle and a downstream end of the nozzle relative to a flow direction of engine exhaust flow through the nozzle.

C23. The vehicle of paragraph C19 (and/or paragraphs C20-C22), wherein a concentration of one or more of the at least one first heat exchange fluid passage and the at least one second heat exchange fluid passage is greater adjacent an upstream end of the nozzle than adjacent a downstream end of the nozzle relative to a flow direction of engine exhaust flow through the nozzle.

C24. The vehicle of paragraph C1 (and/or paragraphs C2-C23), wherein at least the first wall surface of the nozzle comprises an austenitic nickel-chromium-based superalloy, a nickel-chromium-iron based superalloy, a ceramic matrix composite, aluminum, an aluminum alloy, titanium, a titanium alloy, steel, or a steel alloy.

C25. The vehicle of paragraph C1 (and/or paragraphs C2-C24), wherein the cooling fluid is one or more of water, deionized water, inhibited glycol and water solutions, and dielectric fluids.

C26. The vehicle of paragraph C1 (and/or paragraphs C2-C25), further comprising a coolant pump disposed between and coupled to the fluid reservoir and the first cooling subsystem, the coolant pump being configured to pressurize the cooling fluid.

C27. The vehicle of paragraph C1 (and/or paragraphs C2-C26), further comprising an expansion valve disposed between and coupled to the first cooling subsystem and the second cooling subsystem, wherein the expansion valve is configured to convert the cooling fluid from a liquid phase to a gas phase.

C28. The vehicle of paragraph C1 (and/or paragraphs C2-C26), further comprising:

at least one sensor configured to sense one or more of a temperature, pressure, and vapor quality of the cooling fluid within one or more of the first cooling subsystem, a second cooling subsystem of the nozzle cooling system, and the power extraction device; and a controller coupled to the coolant pump and the at least one sensor, the controller being configured to control the coolant pump based on signals received from the at least one sensor.

C29. The vehicle of paragraph C28, wherein the controller effects, with the coolant pump, control of one or more of a cooling fluid flow speed, an amount of cooling fluid entering the first cooling subsystem, a cooling fluid mass flow rate, a temperature of the cooling fluid, and a pressure of the cooling fluid.

C30. The vehicle of paragraph C28, further comprising:

an expansion valve coupled to the controller and being disposed between, so as to be in fluid communication with, the first cooling subsystem and the second cooling subsystem;

wherein the controller effects, with the expansion valve, conversion of the cooling fluid from a liquid phase to a gas phase based on the signals received from the at least one sensor.

C31. The vehicle of paragraph C29, wherein one or more of the at least one sensor is coupled to the nozzle for sensing a temperature of the nozzle.

C32. The vehicle of paragraph C29 (and/or paragraph C31), wherein one or more of the at least one sensor is coupled to the first cooling subsystem for sensing at least one or more of a temperature, pressure, and vapor quality of the cooling fluid within the first cooling subsystem.

C33. The vehicle of paragraph C29 (and/or paragraph 32), wherein one or more of the at least one sensor is coupled to the power extraction device for sensing at least one or more of a temperature, pressure, and vapor quality of the cooling fluid flowing through the power extraction device.

C34. The vehicle of paragraph C29 (and/or paragraphs C32-C33), wherein one or more of the at least one sensor is coupled to the second cooling subsystem for sensing at least one or more of a temperature, pressure, and vapor quality of the cooling fluid within the second cooling subsystem.

C35. The vehicle of paragraph C1 (and/or paragraphs C2-C34), wherein the power extraction device is configured to extract energy from the cooling fluid and produce one or more of mechanical energy and electrical energy therefrom.

C36. The vehicle of paragraph C1 (and/or paragraphs C2-C34) wherein the power extraction device comprises a turbine.

C37. The vehicle of paragraph C1 (and/or paragraphs C2-C35), wherein the power extraction device is one or more of a vapor powered electric generator and a vapor powered mechanical power generator.

C38. The vehicle of paragraph C1 (and/or paragraphs C2-C35) wherein the power extraction device comprises a reciprocating engine.

C39. The vehicle of paragraph C1 (and/or paragraphs C2-C38), wherein the first cooling subsystem includes at least one heat exchange fluid passage having heat transfer protrusions extending from an interior surface of the at least one heat exchange fluid passage.

C40. The vehicle of paragraph C39, wherein the heat transfer protrusions include one or more of pins and fins.

C41. The vehicle of paragraph C1 (and/or paragraphs C2-C40), wherein the air-breathing engine comprises one or more of a supersonic engine and a hypersonic engine.

C42. The vehicle of paragraph C1 (and/or paragraphs C2-C40), wherein the air-breathing engine comprises one or more of a turbofan, turbojet, a ramjet, a combined cycle engine, and a scramjet.

C43. The vehicle of paragraph C1 (and/or paragraphs C2-C42), wherein the vehicle is one or more of a supersonic and hypersonic vehicle.

D1. A method for operating an air-breathing engine, the method comprising:

transferring heat to a cooling fluid from a nozzle of the air-breathing engine using a first cooling subsystem of a nozzle cooling system coupled to the nozzle, where the cooling fluid flows from a fluid reservoir through the first cooling subsystem to at least a power extraction device; and ejecting the cooling fluid from the nozzle cooling system downstream from the power extraction device.

D2. The method of paragraph D1, further comprising:

receiving the cooling fluid from the first cooling subsystem in a second cooling subsystem, of the nozzle cooling system, coupled to both the nozzle and the first cooling subsystem; and ejecting the cooling fluid, from the second cooling subsystem, through the nozzle effecting film cooling of a first wall surface of the nozzle subject to engine exhaust flow.

D3. The method of paragraph D2, further comprising:

extracting energy from the cooling fluid with the power extraction device; and converting the energy extracted from the cooling fluid to one or more of mechanical energy and electrical energy with the power extraction device.

D4. The method of paragraph D2 (and/or paragraphs D3), further comprising:

increasing a temperature of the cooling fluid flowing from the fluid reservoir to the second cooling subsystem using the first cooling subsystem, where the cooling fluid flows through at least one heat exchange fluid passage disposed adjacent a first wall surface of the nozzle so as to increase the temperature of the cooling fluid; and ejecting the cooling fluid in the form of coolant exhaust at the first wall surface to effect film cooling of the first wall surface of the nozzle, where the cooling fluid is ejected through a plurality of film cooling apertures of the second cooling subsystem that are defined by and extend through at least the first wall surface.

D5. The method of paragraph D2 (and/or paragraphs D3-D4), further comprising:

increasing the temperature of the cooling fluid flowing, in liquid phase, through at least one first heat exchange fluid passage of the first cooling subsystem; and increasing another temperature of the cooling fluid flowing, in gas phase, through at least one second heat exchange fluid passage of the second cooling subsystem that is coupled to the first heat exchange cooling passage.

D6. The method of paragraph D2 (and/or paragraphs D3-D5), further comprising converting the cooling fluid from a liquid phase to a gas phase with an expansion (throttle) valve disposed between and coupled to the first cooling subsystem and the second cooling subsystem.

D7. The method of paragraph D2 (and/or paragraphs D3-D6), further comprising:

sensing, with at least one sensor, one or more of a temperature, pressure, and vapor quality of the cooling fluid within one or more of the first cooling subsystem and the second cooling subsystem; and controlling, with a controller coupled to the coolant pump and the at least one sensor, the coolant pump based on signals received from the at least one sensor.

D8. The method of paragraph D7, further comprising effecting, with the controller and the coolant pump, control of one or more of a cooling fluid flow speed, an amount of cooling fluid entering the first cooling subsystem, a cooling fluid mass flow rate, a temperature of the cooling fluid, and a pressure of the cooling fluid.

D9. The method of paragraph D7, further comprising:

effecting, with the controller and an expansion valve conversion of the cooling fluid from a liquid phase to a gas phase based on the signals received from the at least one sensor, where the expansion valve is coupled to the controller and is disposed between, so as to be in fluid communication with, the first cooling subsystem and the second cooling subsystem.

D10. The method of paragraph D7, further comprising sensing, with one or more of the at least one sensor, a temperature of the nozzle.

D11. The method of paragraph D7 (and/or paragraph D10), further comprising sensing, with one or more of the at least one sensor, at least one or more of a temperature, pressure, and vapor quality of the cooling fluid within the first cooling subsystem.

D12. The method of paragraph D7 (and/or paragraphs D10-D11), further comprising sensing, with one or more of the at least one sensor, at least one or more of a temperature, pressure, and vapor quality of the cooling fluid within the second cooling subsystem.

D13. The method of paragraph D1 (and/or paragraphs D2-D12), wherein transferring heat to the cooling fluid from the nozzle comprises transferring heat from the nozzle to one or more of water, deionized water, inhibited glycol and water solutions, and dielectric fluids flowing from the fluid reservoir.

D14. The method of paragraph D1 (and/or paragraphs D2-D13), further comprising pressurizing the cooling fluid with a coolant pump disposed between and coupled to the fluid reservoir and the first cooling subsystem.

D15. The method of paragraph D1 (and/or paragraphs D2-D14), further comprising providing the air-breathing engine as one or more of a supersonic engine and a hypersonic engine.

D16. The method of paragraph D1 (and/or paragraphs D2-D14), further comprising providing the air-breathing engine as one or more of a turbofan, turbojet, a ramjet, a combined cycle engine, and a scramjet.

E1. A method for operating a vehicle, the method comprising:

transferring heat to a cooling fluid from a nozzle of an air-breathing engine of the vehicle using a first cooling subsystem of a nozzle cooling system coupled to the nozzle, where the cooling fluid flows from a fluid reservoir through the first cooling subsystem to at least a power extraction device, and where engine exhaust flow exits the air-breathing engine through the nozzle; and ejecting the cooling fluid from the nozzle cooling system downstream from the power extraction device.

E2. The method of paragraph E1, further comprising:

receiving the cooling fluid from the first cooling subsystem in a second cooling subsystem, of the nozzle cooling system, coupled to both the nozzle and the first cooling subsystem; and ejecting the cooling fluid, from the second cooling subsystem, through the nozzle effecting film cooling of a first wall surface of the nozzle subject to engine exhaust flow.

E3. The method of paragraph E2, further comprising:

extracting energy from the cooling fluid with the power extraction device; and converting the energy extracted from the cooling fluid to one or more of mechanical energy and electrical energy with the power extraction device.

E4. The method of paragraph E2 (and/or paragraphs E3), further comprising:

increasing a temperature of the cooling fluid flowing from the fluid reservoir to the second cooling subsystem using the first cooling subsystem, where the cooling fluid flows through at least one heat exchange fluid passage disposed adjacent a first wall surface of the nozzle so as to increase the temperature of the cooling fluid; and ejecting the cooling fluid in the form of coolant exhaust at the first wall surface to effect film cooling of the first wall surface of the nozzle, where the cooling fluid is ejected through a plurality of film cooling apertures of the second cooling subsystem that are defined by and extend through at least the first wall surface.

E5. The method of paragraph E2 (and/or paragraphs E3-E4), further comprising:

increasing the temperature of the cooling fluid flowing, in liquid phase, through at least one first heat exchange fluid passage of the first cooling subsystem; and increasing another temperature of the cooling fluid flowing, in gas phase, through at least one second heat exchange fluid passage of the second cooling subsystem that is coupled to the first heat exchange cooling passage.

E6. The method of paragraph E2 (and/or paragraphs E3-E5), further comprising converting the cooling fluid from a liquid phase to a gas phase with an expansion valve disposed between and coupled to the first cooling subsystem and the second cooling subsystem.

E7. The method of paragraph E2 (and/or paragraphs E3-E6), further comprising:

sensing, with at least one sensor, one or more of a temperature, pressure, and vapor quality of the cooling fluid within one or more of the first cooling subsystem and the second cooling subsystem; and controlling, with a controller coupled to the coolant pump and the at least one sensor, the coolant pump based on signals received from the at least one sensor.

E8. The method of paragraph E7, further comprising effecting, with the controller and the coolant pump, control of one or more of a cooling fluid flow speed, an amount of cooling fluid entering the first cooling subsystem, a cooling fluid mass flow rate, a temperature of the cooling fluid, and a pressure of the cooling fluid.

E9. The method of paragraph E7, further comprising:

effecting, with the controller and an expansion valve conversion of the cooling fluid from a liquid phase to a gas phase based on the signals received from the at least one sensor, where the expansion valve is coupled to the controller and is disposed between, so as to be in fluid communication with, the first cooling subsystem and the second cooling subsystem.

E10. The method of paragraph E7, further comprising sensing, with one or more of the at least one sensor, a temperature of the nozzle.

E11. The method of paragraph E7 (and/or paragraph E10), further comprising sensing, with one or more of the at least one sensor, at least one or more of a temperature, pressure, and vapor quality of the cooling fluid within the first cooling subsystem.

E12. The method of paragraph E7 (and/or paragraphs E10-E11), further comprising sensing, with one or more of the at least one sensor, at least one or more of a temperature, pressure, and vapor quality of the cooling fluid within the second cooling subsystem.

E13. The method of paragraph E1 (and/or paragraphs E2-E12), wherein transferring heat to the cooling fluid from the nozzle comprises transferring heat from the nozzle to one or more of water, deionized water, inhibited glycol and water solutions, and dielectric fluids flowing from the fluid reservoir.

E14. The method of paragraph E1 (and/or paragraphs E2-E13), further comprising pressurizing the cooling fluid with a coolant pump disposed between and coupled to the fluid reservoir and the first cooling subsystem.

E15. The method of paragraph E1 (and/or paragraphs E2-E14), further comprising providing the air-breathing engine as one or more of a supersonic engine and a hypersonic engine.

E16. The method of paragraph E1 (and/or paragraphs E2-E14), further comprising providing the air-breathing engine as one or more of a turbofan, turbojet, a ramjet, a combined cycle engine, and a scramjet.

E17. The method of paragraph E1 (and/or paragraphs E2-E16), further comprising providing the vehicle as one or more of a supersonic and hypersonic vehicle.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 19 and 20, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 19 and 20 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es), system(s), and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method for operating a vehicle, the method comprising:
   transferring, with a coolant pump, a cooling fluid from a fluid reservoir to a first cooling subsystem of a nozzle cooling system;
   transferring heat to the cooling fluid from a nozzle of an air-breathing engine of the vehicle using the first cooling subsystem of the nozzle cooling system coupled to the nozzle, where the cooling fluid flows from the fluid reservoir through the first cooling subsystem to at least a power extraction device, and where the power extraction device is separate and distinct from the coolant pump and engine thrust exhaust flow exits the air-breathing engine through the nozzle; and
   ejecting the cooling fluid from the nozzle cooling system downstream from the power extraction device, wherein the cooling fluid is physically separated from and distinct from fluid flow through the air-breathing engine until after the cooling fluid is ejected from the nozzle cooling system, wherein the cooling fluid is one of: (a) ejected, during operation of the air-breathing engine, from an exhaust collector of the power extraction device to an external environment without combusting the cooling fluid in the engine exhaust flow or (b) ejected through the nozzle to effect film cooling of the nozzle.

2. The method of claim 1, further comprising: receiving the cooling fluid from the first cooling subsystem in a second cooling subsystem, of the nozzle cooling system, coupled to both the nozzle and the first cooling subsystem; and ejecting the cooling fluid, from the second cooling subsystem, through the nozzle effecting film cooling of a first wall surface of the nozzle subject to engine thrust exhaust flow.

3. The method of claim 2, further comprising: sensing, with at least one sensor, one or more of a temperature, a pressure, and a vapor quality of the cooling fluid within one or more of the first cooling subsystem and the second cooling subsystem; and controlling, with a controller coupled to the coolant pump and the at least one sensor, the coolant pump based on signals received from the at least one sensor.

4. The method of claim 3, further comprising: effecting, with the controller and an expansion valve, conversion of the cooling fluid from a liquid phase to a gas phase based on the signals received from the at least one sensor, where the expansion valve is coupled to the controller and is disposed between, so as to be in fluid communication with, the first cooling subsystem and the second cooling subsystem.

5. A nozzle wall cooling system for an air-breathing engine, the nozzle wall cooling system comprising:
   a first wall surface of a nozzle wall, the first wall surface being subject to engine exhaust flow;
   a fluid reservoir containing a cooling fluid;
   at least one heat exchange fluid passage disposed adjacent the first wall surface;
   a coolant pump coupled between the fluid reservoir and the at least one heat exchange fluid passage; and
   wherein:
      the at least one heat exchange fluid passage is configured to increase a temperature of the cooling fluid flowing from the fluid reservoir to at least a power extraction device, the power extraction device being separate and distinct from the coolant pump; and the nozzle wall cooling system is configured such that the cooling fluid is physically separated from and distinct from fluid flow through the air-breathing engine until after the cooling fluid is ejected from the nozzle wall cooling system downstream from the power extraction device, through the first wall surface of the nozzle wall to effect film cooling of the first wall surface.

6. The nozzle wall cooling system of claim 5, wherein the nozzle wall cooling system further includes a plurality of film cooling apertures defined by and extending through at least the first wall surface so that the plurality of film cooling apertures eject the cooling fluid as power extraction device exhaust gas at the first wall surface to effect film cooling of the first wall surface.

7. The nozzle wall cooling system of claim 6, further comprising a second wall surface wherein the plurality of film cooling apertures are defined by and extend through the first wall surface and the second wall surface.

8. The nozzle wall cooling system of claim 6, wherein one or more of the at least one heat exchange fluid passage is disposed upstream of one or more of the plurality of film cooling apertures relative to a flow direction of the engine exhaust flow.

9. The nozzle wall cooling system of claim 6, wherein one or more of the at least one heat exchange fluid passage is disposed downstream of one or more of the plurality of film cooling apertures relative to a flow direction of the engine exhaust flow.

10. The nozzle wall cooling system of claim 6, wherein the at least one heat exchange fluid passage and the plurality of film cooling apertures are alternately arranged relative to each other in a direction substantially parallel with a flow direction of the engine exhaust flow.

11. The nozzle wall cooling system of claim 5, wherein the nozzle wall further comprises: an upstream end, relative to a flow direction of the engine exhaust flow, defined at least by the first wall surface; and a downstream end defined at least by the first wall surface and disposed downstream from the upstream end.

12. The nozzle cooling system wall of claim 11, wherein the at least one heat exchange fluid passage comprises a first heat exchange fluid passage and a second heat exchange fluid passage, wherein the first heat exchange fluid passage is configured to increase the temperature of the cooling fluid flowing through the first heat exchange fluid passage in liquid phase, and the second heat exchange fluid passage is coupled to the first heat exchange fluid passage and is configured to increase another temperature of the cooling fluid flowing through the second heat exchange fluid passage in gas phase.

13. A vehicle comprising:
an air-breathing engine having a nozzle wherein engine thrust exhaust flow exits the air-breathing engine through the nozzle;
a nozzle cooling system including:
a fluid reservoir configured to contain a cooling fluid,
a power extraction device,
a first cooling subsystem coupled to the nozzle so as to transfer heat from the nozzle to the cooling fluid flowing from the fluid reservoir to at least the power extraction device, and
a coolant pump coupled between the fluid reservoir and the first cooling subsystem where the coolant pump is separate and distinct from the power extraction device and configured to transfer the cooling fluid from the fluid reservoir to the first cooling subsystem along a flow path that is physically separated and distinct from a flow path of fluid through the air-breathing engine; and
wherein the cooling fluid is physically separated from and distinct from fluid flow through the air-breathing engine until after the cooling fluid is ejected from the nozzle cooling system downstream from the power extraction device, through the nozzle to effect film cooling of the nozzle.

14. The vehicle of claim 13, wherein: the nozzle includes a first wall surface; and the first cooling subsystem includes at least one heat exchange fluid passage disposed adjacent the first wall surface so as to increase a temperature of the cooling fluid flowing from the fluid reservoir to the power extraction device.

15. The vehicle of claim 13, wherein the nozzle cooling system further includes a second cooling subsystem coupled to both the nozzle and the first cooling subsystem, wherein the second cooling subsystem is configured to receive the cooling fluid from the first cooling subsystem, wherein at least a temperature of the cooling fluid is reduced by the power extraction device, and eject the cooling fluid through the nozzle to effect the film cooling of a first wall surface of the nozzle subject to the engine thrust exhaust flow.

16. The vehicle of claim 15, wherein the second cooling subsystem includes a plurality of film cooling apertures defined by and extending through at least the first wall surface so that the plurality of film cooling apertures eject the cooling fluid in a form of coolant exhaust at the first wall surface to provide film cooling of the first wall surface of the nozzle.

17. The vehicle of claim 13, further comprising an expansion valve disposed between and coupled to the first cooling subsystem and a second cooling subsystem of the nozzle cooling system, wherein the expansion valve is configured to convert the cooling fluid from a liquid phase to a gas phase.

18. The vehicle of claim 13, further comprising: at least one sensor configured to sense one or more of a temperature, a pressure, and a vapor quality of the cooling fluid within one or more of the first cooling subsystem, a second cooling subsystem of the nozzle cooling system, and the power extraction device; and a controller coupled to the coolant pump and the at least one sensor, the controller being configured to control the coolant pump based on signals received from the at least one sensor.

19. The vehicle of claim 18, further comprising: an expansion valve coupled to the controller and being disposed between, so as to be in fluid communication with, the first cooling subsystem and the second cooling subsystem; wherein the controller effects, with the expansion valve, conversion of the cooling fluid from a liquid phase to a gas phase based on the signals received from the at least one sensor.

20. The vehicle of claim 13, wherein the power extraction device is configured to extract energy from the cooling fluid and produce one or more of mechanical energy and electrical energy therefrom.

* * * * *